United States Patent [19]

Seki et al.

[11] Patent Number: 4,960,083
[45] Date of Patent: Oct. 2, 1990

[54] FAILSAFE METHOD IN CONNECTION WITH VALVE TIMING-CHANGEOVER CONTROL FOR INTERNAL COMBUSTION ENGINES

[75] Inventors: Yasunari Seki; Isao Yahata, both of Wako, Japan

[73] Assignee: Honda Giken Kogyo Kabushiki Kaisha, Tokyo, Japan

[21] Appl. No.: 388,647

[22] Filed: Aug. 1, 1989

[30] Foreign Application Priority Data

Oct. 11, 1988 [JP] Japan .................................. 63-255291
Oct. 11, 1988 [JP] Japan .................................. 63-255292
Oct. 11, 1988 [JP] Japan .................................. 63-255293

[51] Int. Cl.⁵ ............................................. F01L 1/34
[52] U.S. Cl. .................................................. 123/90.16
[58] Field of Search ................ 123/90.15, 90.16, 90.17

[56] References Cited

U.S. PATENT DOCUMENTS

| | | | |
|---|---|---|---|
| 4,523,550 | 6/1985 | Matsuura | 123/90.17 |
| 4,632,069 | 12/1986 | Aoki et al. | 123/41.15 |
| 4,656,977 | 4/1987 | Nagahiro et al. | 123/90.16 |
| 4,777,922 | 10/1988 | Mieno et al. | 123/479 |
| 4,819,602 | 4/1989 | Mieno et al. | 123/479 |
| 4,876,995 | 10/1989 | Otobe et al. | 123/90.16 |

FOREIGN PATENT DOCUMENTS 49-33289 9/1974 Japan .
61-157143 9/1986 Japan .

Primary Examiner—Charles J. Myhre
Assistant Examiner—Weilun Lo
Attorney, Agent, or Firm—Lyon & Lyon

[57] ABSTRACT

A failsafe method in connection with valve timing-changeover control for an internal combustion engine. An abnormality in a control system of the engine is detected. A changeover-instructing signal is generated for changing the valve timing to the low speed valve timing in both of the lower and higher engine speed regions, when the abnormality is detected. When the abnormality is detected, the air-fuel ratio of an air-fuel mixture to be supplied to the engine is enriched when the engine is in a predetermined operating condition determined by the detected value of at least one engine parameter. The enriching of the air-fuel ratio of the air-fuel mixture is carried out by multiplying a basic fuel injection period by a correction coefficient or selecting a suitable basic fuel injection period map.

10 Claims, 22 Drawing Sheets

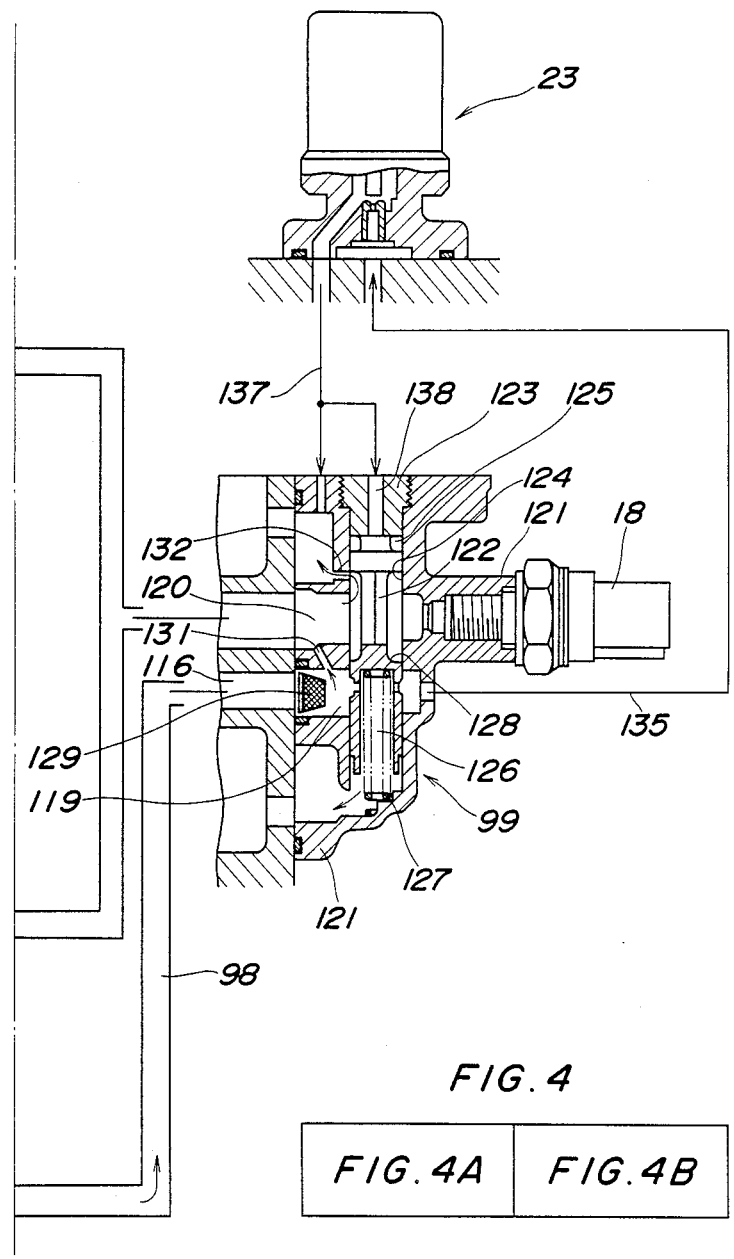

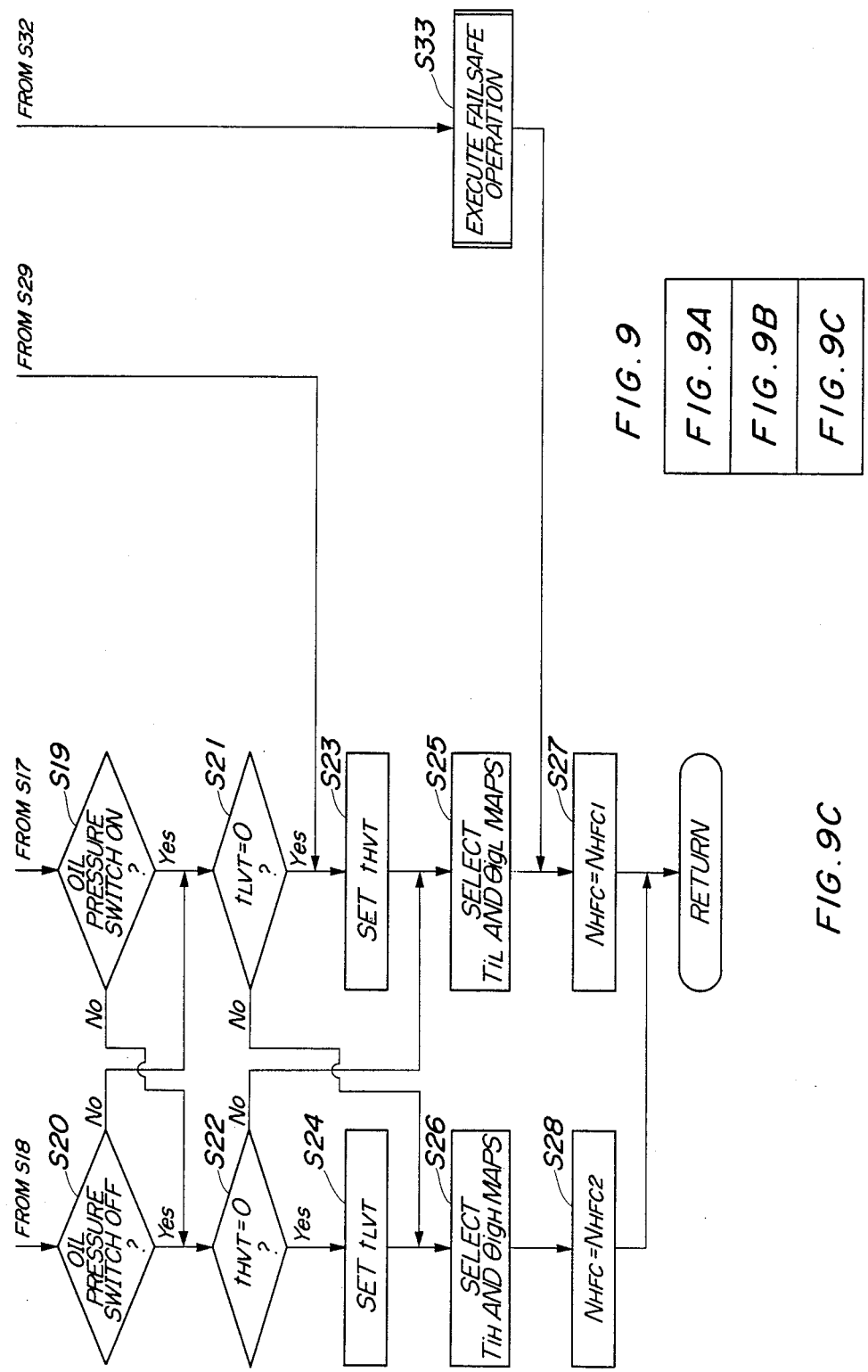

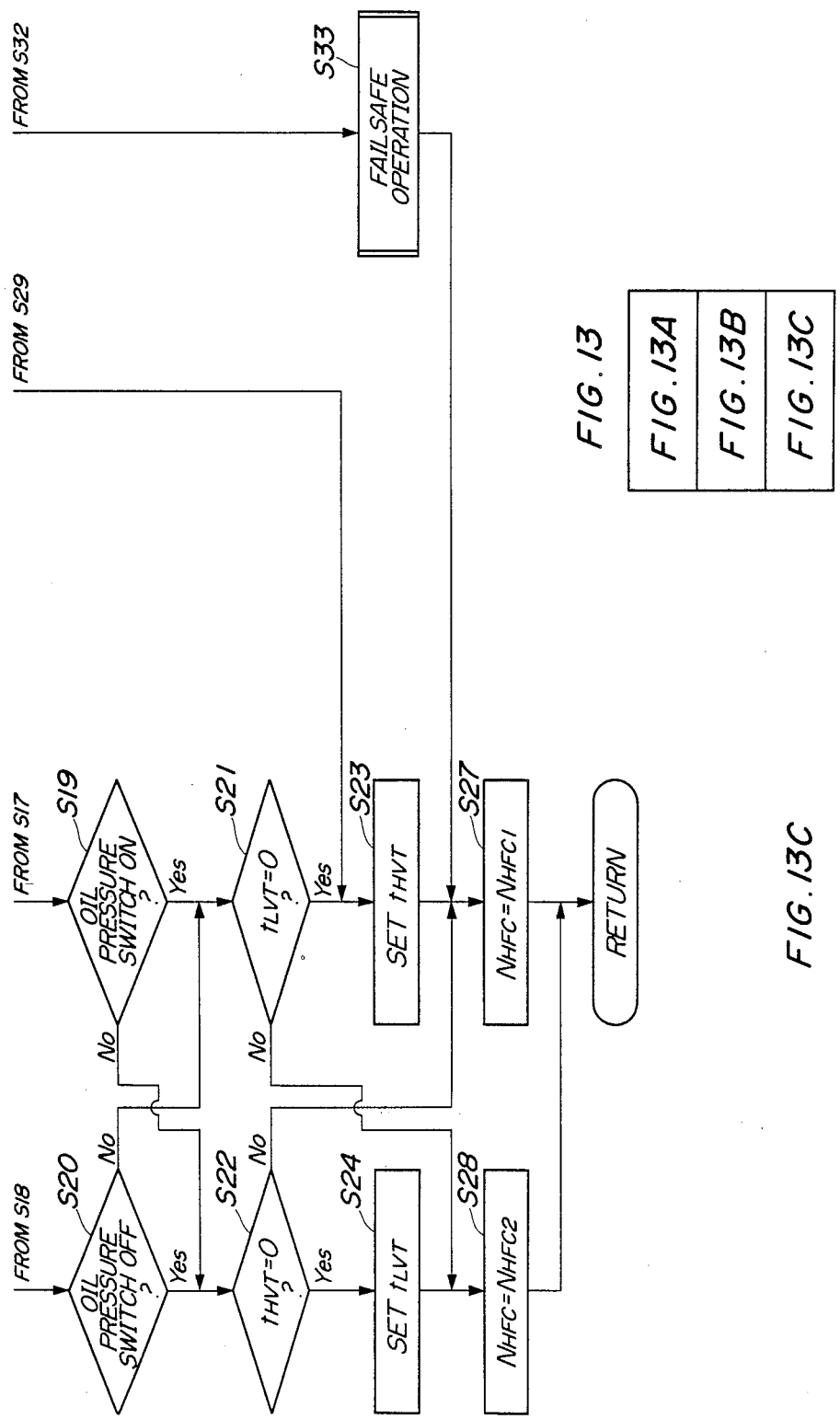

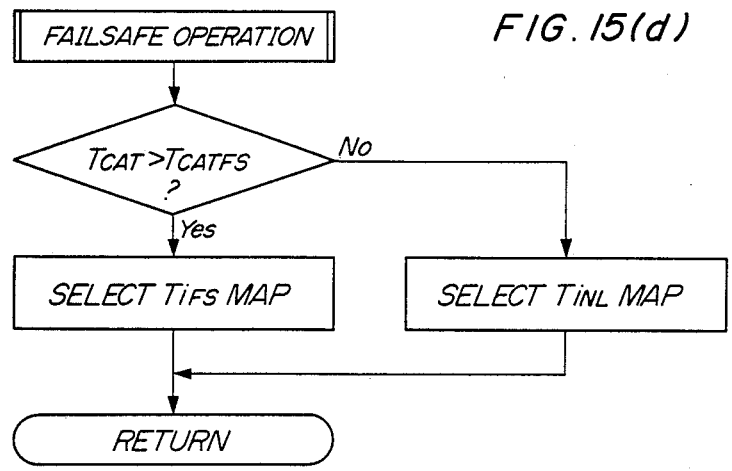
FIG.15(d)
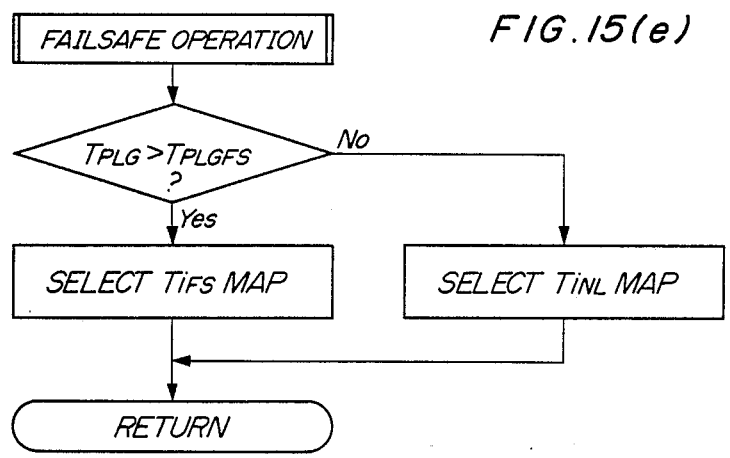
FIG.15(e)
FIG.16
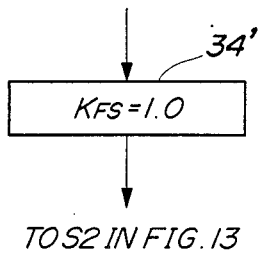

(a)

(b)

(c)

FAILSAFE METHOD IN CONNECTION WITH VALVE TIMING-CHANGEOVER CONTROL FOR INTERNAL COMBUSTION ENGINES

BACKGROUND OF THE INVENTION

This invention relates to valve timing-changeover control for an internal combustion engine which is capable of changing the valve timing of inlet and exhaust valves, and particularly to a method of effecting failsafe operation in connection with the valve timing control when there arises abnormality in the engine control system, e.g. when a sensor for detecting operating conditions of the engine is faulty.

An engine is conventionally known, which is capable of changing the valve timing of inlet valves and/or exhaust valves between low speed valve timing suitable for a lower engine rotational speed region and high speed valve timing suitable for a higher engine rotational speed region, e.g. from Japanese Patent Publication (Kokoku) No. 49-33289. Amongst methods of controlling changeover of the valve timing and fuel injection associated therewith, the following two methods have been proposed:

(1) A method, proposed by Japanese Provisional Utility Model Publication (Kokai) No. 61-157143, which comprises:

setting a high speed valve timing region in which high speed valve timing is to be selected and a low speed valve timing region in which low speed valve timing is to be selected, in accordance with the engine rotational speed Ne and the intake pipe absolute pressure $P_{BA}$, and changing the valve timing between the high speed valve timing and the low speed valve timing in response to Ne and $P_{BA}$; and at the same time setting a basic fuel injection period for determining the amount of fuel to be supplied to the engine by the use of a map of the engine rotational speed Ne and the intake pipe absolute pressure $P_{BA}$, in which map values of the basic fuel injection period are so set as to obtain air-fuel ratios optimum for the high speed valve timing and low speed valve timing selected.

(2) A method, proposed by Japanese Patent Application No. 63-192239 filed by the assignee of the preset application, which comprises:

providing a basic fuel injection period map set for low speed valve timing and a basic fuel injection period map set for high speed valve timing;

changing the valve timing when two values respectively read from the two maps depending on engine operating condition are substantially equal to each other; and determining the amount of fuel to be supplied to the engine based on a value of basic fuel injection period read from the high speed valve timing map when the high speed valve timing is selected, and based on a value of basic fuel injection period read from the low speed valve timing map when the low speed valve timing is selected.

In an engine and a control system therefor to which the above conventional method (1) or (2) is applied, the changeover of the valve timing is specifically carried out in the following manner:

An instruction signal is supplied from an electronic control unit to an electromagnetic valve to open and close same, which in turn causes an oil pressure-changeover valve to be opened and closed. This changes the oil pressure supplied to a valve timing-changeover mechanism which operates in response to the resulting high or low oil pressure to change the valve timing between high speed valve timing and low speed valve timing.

In connection with the above-described valve timing control, a failsafe method has been proposed by the assignee of the present application in the above-mentioned Japanese Patent Application No. 63-192239, in which when abnormality in an engine operating parameter sensor or the like is detected, the valve timing is held at the low speed valve timing irrespective of engine operating conditions. However, this method suffers from the following problems:

When abnormality in an engine operating parameter sensor or the like is detected, an instruction signal for changing the valve timing to the low speed valve timing is supplied from the electronic control unit to the electromagnetic valve. However, there may be a case in which due to failure of the oil pressure-changeover valve or the valve timing-changeover mechanism, the valve timing is not actually changed to the low speed valve timing and continually held at the high speed valve timing.

In this case, it can happen that even when the engine operating condition is in the low speed valve timing region, the valve timing is actually held at the high speed valve timing. If the above failsafe method is applied to the first-mentioned method (1) in such case, it gives rise to the following inconveniences: For example, if the low speed valve timing region and the high speed valve timing region are set as shown in FIG. 14, when the engine is in a fairly high speed region above 3,000 rpm (even though the engine rotational speed is lower than a predetermined value Ne1 at which valve timing changeover is to be made), the amount of fuel to be supplied to the engine is determined based on the basic fuel injection period for the low speed valve timing in spite of the fact that the actual valve timing is held at the high speed valve timing as described above, so that the air-fuel ratio of the mixture becomes lean, resulting in increased combustion temperature or increased temperature of a catalyst in the exhaust gas purifying means (e.g. above 1,000° C.). This may cause preignition, which leads to melting of ignition plugs and knocking at a high engine rotational speed, shortened life of the catalyst, etc.

On the other hand, if the above failsafe method is applied to the second-mentioned method (2), when abnormality in an engine operating parameter sensor or the like is detected, the electronic control unit generates an instruction signal for changing the valve timing to the low speed valve timing, and the amount of fuel to be supplied to the engine is determined based on the basic fuel injection period read from the low speed valve timing map. However, it can happen that although the valve timing is actually held at the high speed valve timing, the amount of fuel to be supplied to the engine is determined based on fuel injection period read from the low speed valve timing map.

Since values of the basic fuel injection period for the low speed valve timing are set at greater values than those for the high speed valve timing in the lower engine speed region, and inversely smaller than those for the high speed valve timing in the higher engine speed region, if in the higher engine speed region, the fuel amount is determined based on the basic fuel injection period read from the low speed valve timing map in spite of the fact that the valve timing is actually held at the high speed valve timing, the air-fuel ratio of the mixture becomes lean, which gives rise to the same inconveniences as stated above concerning the method (1).

The above-mentioned inconveniences are conspicuous particularly when the engine is in an operating region in which the engine rotational is high and at the same time load on the engine is high.

SUMMARY OF THE INVENTION

It is the object of the invention to provide a method of effecting failsafe operation in connection with valve timing-changeover control for an internal combustion engine, which is capable of properly controlling the air-fuel ratio of a mixture to be supplied to the engine even when abnormality in the engine control system including sensors for detecting engine operating conditions is detected, to thereby prevent an excessive rise in the combustion temperature as well as in the temperature of the catalyst and hence solve the problems of melting of ignition plugs, knocking at a high engine rotational speed, shortened life of the catalyst, etc.

To attain the above object, according to a first aspect of the invention, there is provided a failsafe method in connection with valve timing-changeover control for an internal combustion engine, the engine including a set of inlet valves and a set of exhaust valves and being controlled by a control system having an electronic control unit, at least one of the sets of inlet and exhaust valves having valve timing thereof changeable between low speed valve timing suitable for a lower engine speed region and high speed valve timing suitable for a higher engine speed region, in response to a changeover-instructing signal generated by the electronic control unit.

The failsafe method according to the first aspect of the invention is characterized by comprising the steps of:

(1) detecting an abnormality in the control system of the engine;

(2) generating the changeover-instructing signal for changing the valve timing to the low speed valve timing in both of the lower and higher engine speed regions, when the abnormality is detected;

(3) detecting a value of at least one engine operating parameter; and (4) when the abnormality is detected, enriching an air-fuel ratio of an air-fuel mixture to be supplied to the engine when the engine is in a predetermined operating condition determined by the detected value of the at least one engine parameter.

Preferably, the enriching of the air-fuel ratio of the step (4) is carried out by multiplying a basic fuel injection period for determining an amount of fuel to be supplied to the engine by a correction coefficient.

Alternatively, the step (4) comprises the steps of:

(4a) providing a first basic fuel injection period map for normal operation and a second basic fuel injection period map for failsafe operation as a map of a basic fuel injection period for determining an amount of fuel to be supplied to the engine, the second basic fuel injection period map having values thereof set relative to respective corresponding values of the first basic fuel injection period map such that the former make the air-fuel ratio richer than the latter do in the predetermined engine operating region; and (4b) supplying the engine with an amount of fuel based on a basic fuel injection period read from the second basic fuel injection period map when the engine is in the predetermined operating condition determined by the detected value of the at least one engine parameter, when the abnormality is detected.

According to a second aspect of the invention, there is provided a failsafe method in connection with valve timing-changeover control for an internal combution engine, the engine including a set of inlet valves and a set of exhaust valves and being controlled by a control system having an electronic control unit, at least one of the sets of inlet and exhaust valves having valve timing thereof changeable between low speed valve timing suitable for a lower engine speed region and high speed valve timing suitable for a higher engine speed region, in response to a changeover-instructing signal generated by the electronic control unit at a point of time at which a basic fuel injection period value set in a manner suitable for the low speed valve timing and a basic fuel injection period value set in a manner suitable for the high speed valve timing become substantially equal to each other.

The second aspect of invention is characlerzied by comprising the steps of:

(1) detecting an abnormality in the control system of the engine;

(2) generating the changeover-instructing signal for changing the valve timing to the low speed valve timing in both of the lower and higher engine speed regions, when the abnormality is detected;

(3) detecting a value of at least one engine operating parameter; and (4) when the abnormality is detected, supplying the engine with an amount of fuel based on the basic fuel injection period value set in a manner suitable for the high speed valve timing when the engine is in a predetermined operating condition determined by the detected value of the at least one engine parameter.

In both of the first and second aspects of the invention, prefeably, the at least one engine operating parameter is the rotational speed of the engine, and the predetermined operating condition is a condition in which the rotational speed of the engine is higher than a predetermined value.

Alternatively, the at least one engine operating parameter is load on the engine, and the predetermined operating condition is a condition in which the load on the engine is greater than a predetermined value.

Alternatively, the at least one engine operating parameter are the rotational speed of the engine and load on the engine, and the predetermined operating condition is a condition in which the rotational speed of the engine is higher than a predetermined value and at the same time the load on the engine is greater than a predetermined value.

Alternatively, the at least one engine operating parameter is a catalyst temperature of exhaust gas puriying means provided in an exhaust system of the engine, and the predetermined operating condition is a condition in which the catalyst temperature is higher than a predetermined value.

Alternatively, the at least one engine operating parameter is a temperature of an ignition plug of the engine, and the predetermined operating condition is a condition in which the temperature of the ignition plug is higher than a predetermined value.

The above and other objects, features, and advantages of the present invention will become more apparent from the ensuing detailed description taken in conjunction with the accompanying drawings.

BRIEF DESCRIPTION OF THE DRAWINGS

FIGS. 4, 4a, and 4b are schematic diagrams showing an oil-feeding system and an oil pressure-changeover device;

FIGS. 9, 9a, 9b, and 9c are flowcharts of a program for controlling the changeover of the valve timing;

Figure 14:
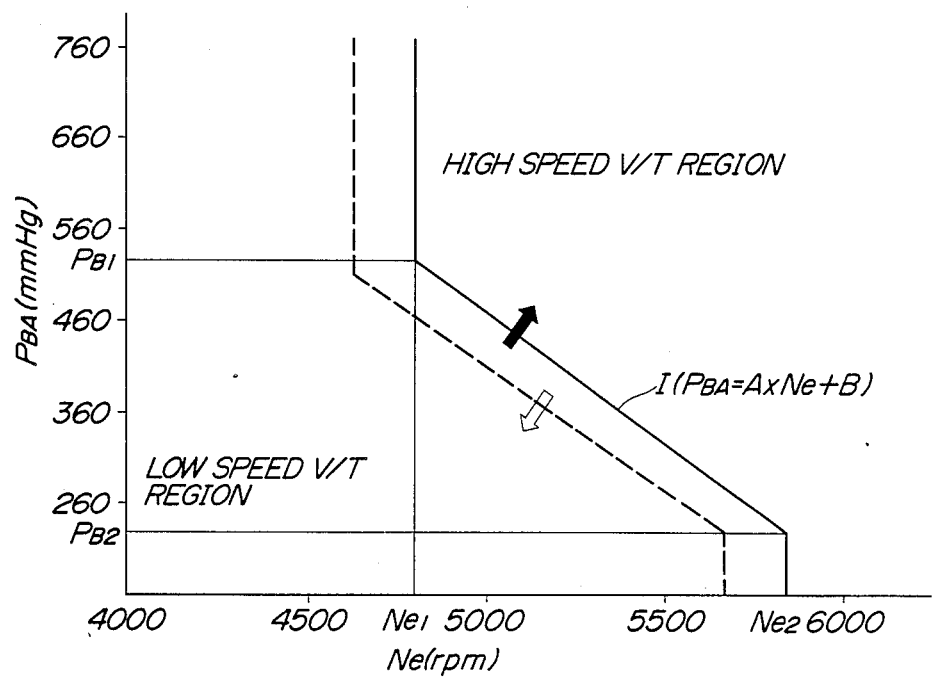
Figure 15A:
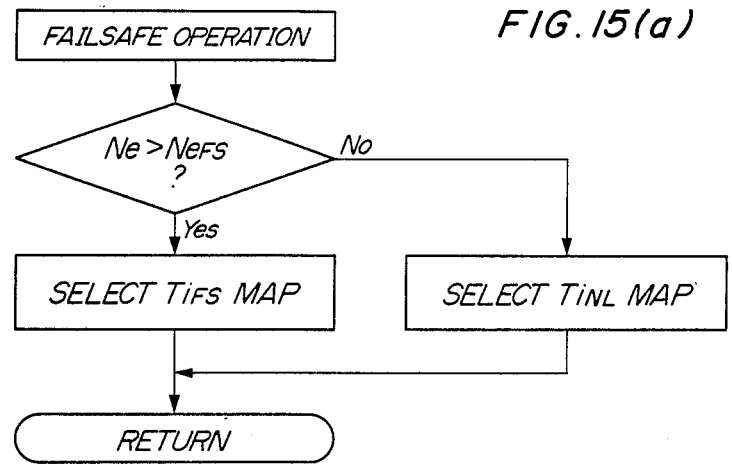
Figure 15B:
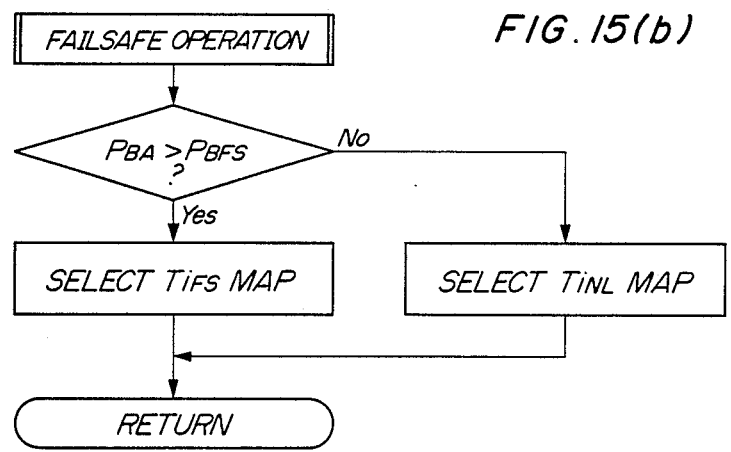
Figure 15C:
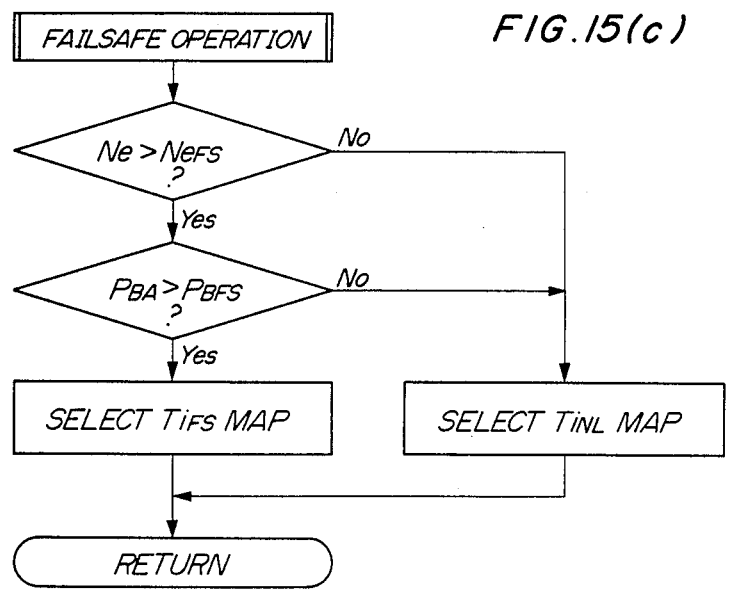
Figure 17A:
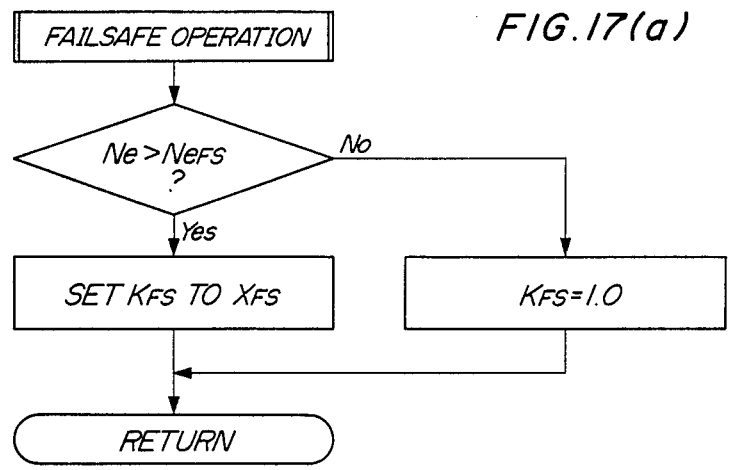
Figure 17B:
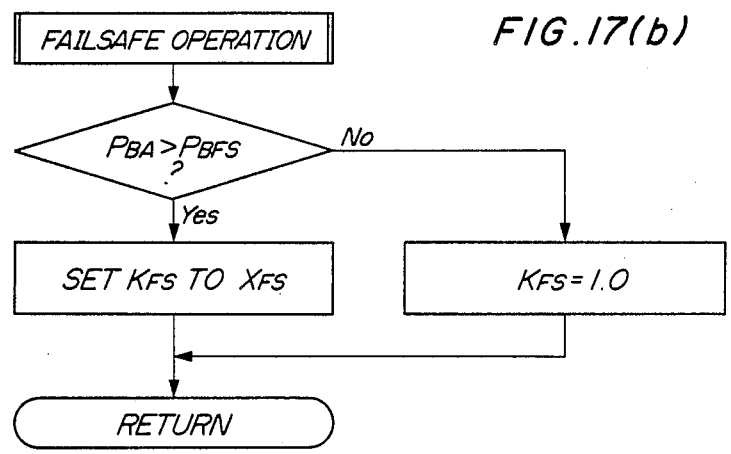
Figure 17C:
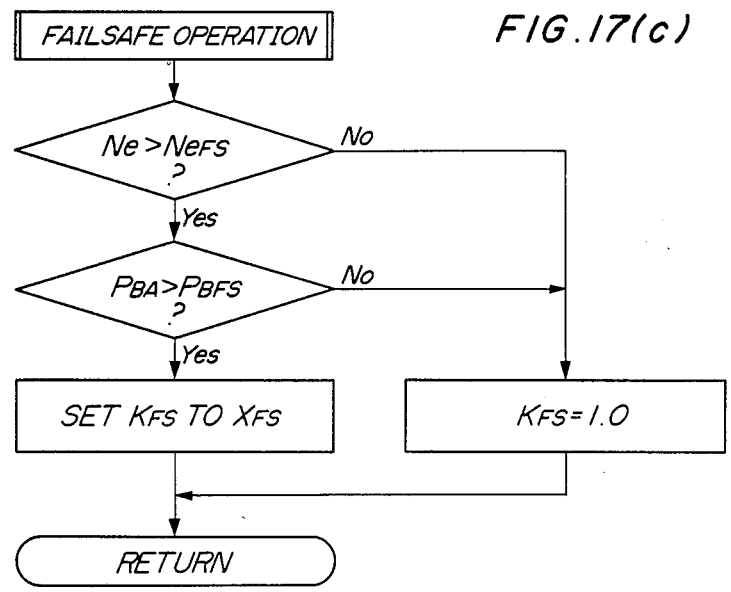
Figure 17D:
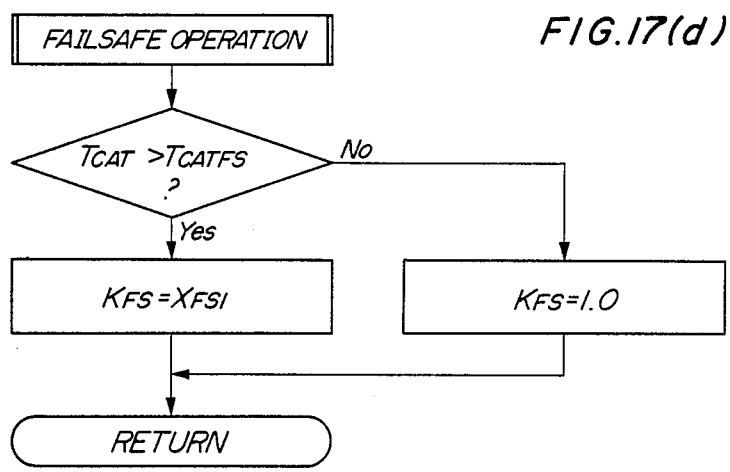
Figure 17E:
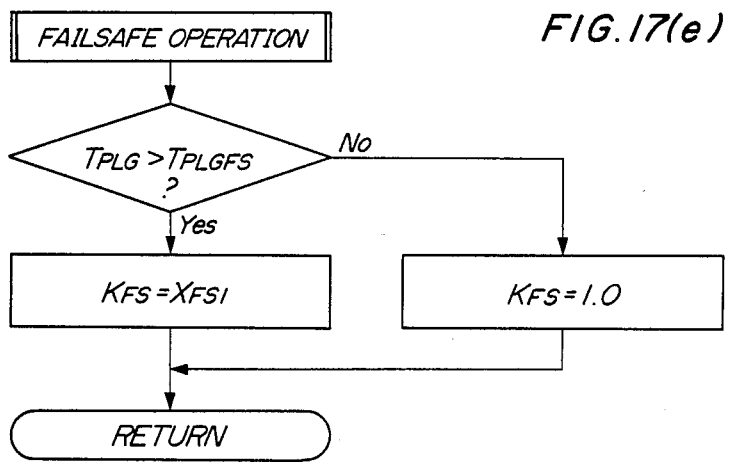
Figure 18:
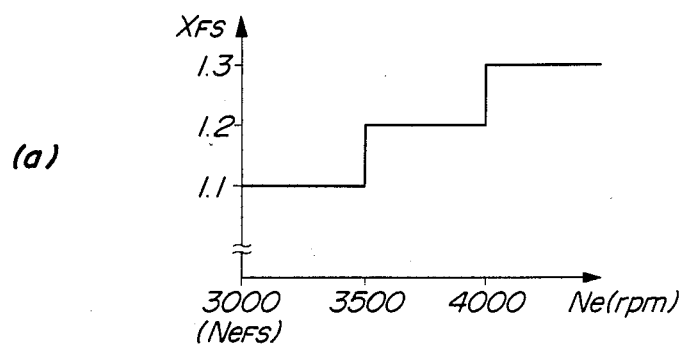
Figure 18:
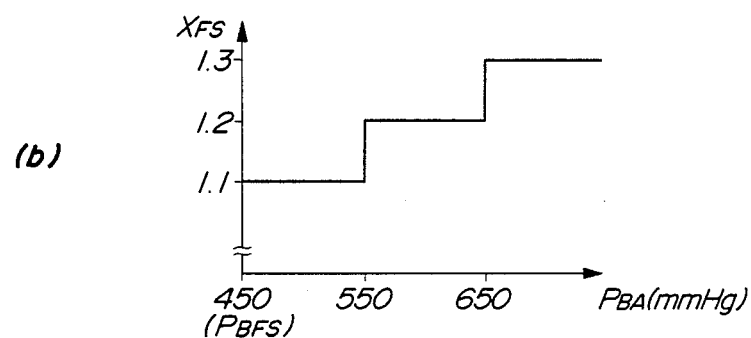
Figure 18:
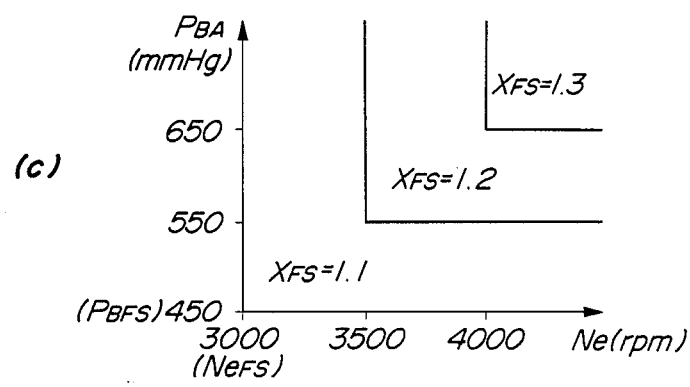

(a) to (e) of FIG. 15 are flowcharts of subroutines for executing the failsafe operation;

FIGS. 13, 13a, 13b, and 13c are flowcharts of a subroutine for controlling the changeover of the valve timing;

FIG. 14 is a diagram showing lower speed and higher speed valve timing regions;

(a) to (e) of FIG. 15 are flowcharts of subroutines for executing the failsafe operation;

FIG. 16 is part of a flowchart of a subroutine for controlling the changeover of the valve timing;

(a) to (e) of FIG. 17 are flowcharts of subroutines for executing the failsafe operation; and (a) to (c) of FIG. 18 are diagrams showing examples of setting of a predetermined enriching value $X_{FS}$.

DETAILED DESCRIPTION

The method according to the invention will now be described in detail with reference to the drawings showing embodiments thereof.

Figure 1:
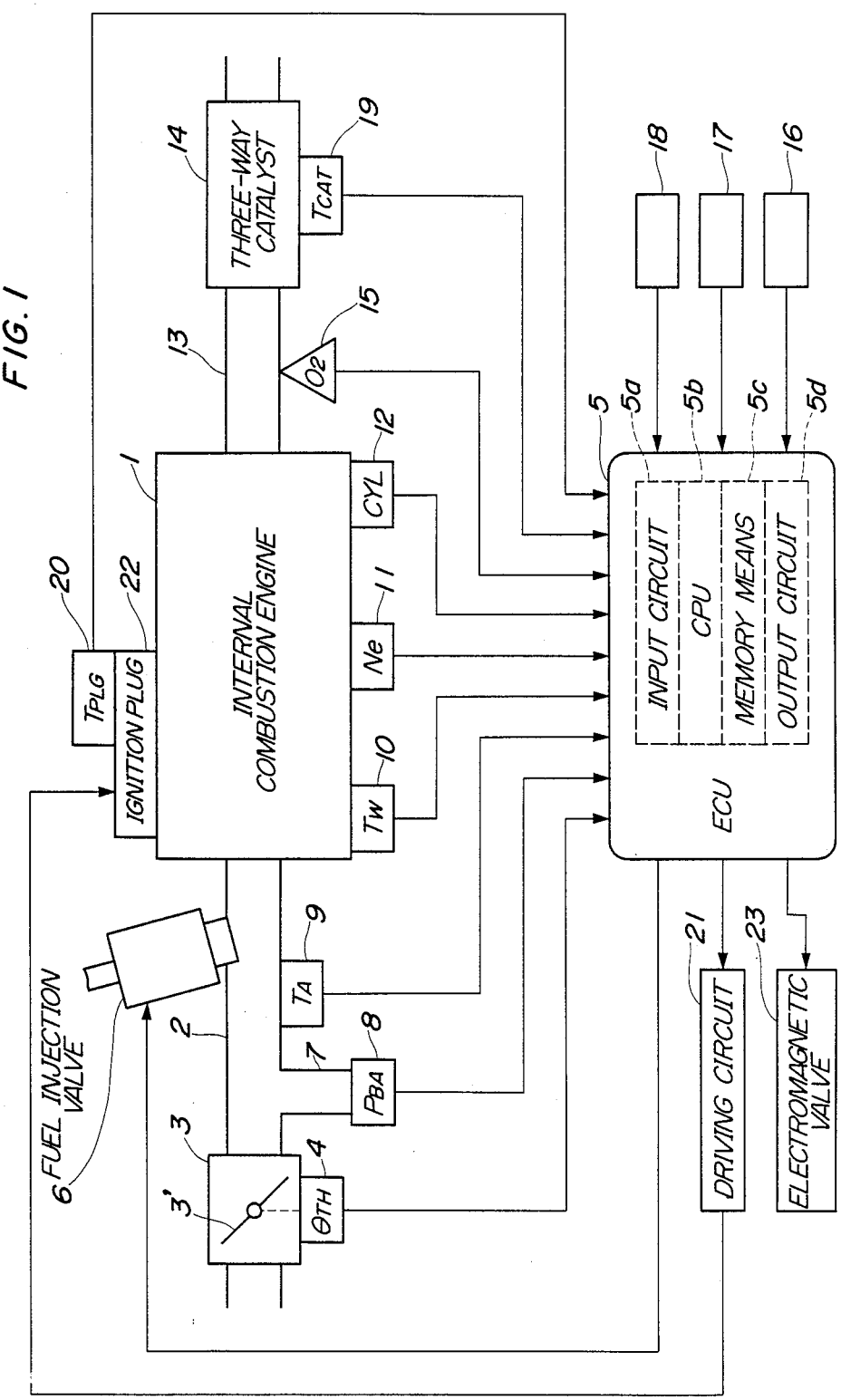
FIG. 1 is a schematic diagram showing the whole arrangement of an internal combustion engine and a control system therefor to which the failsafe method according to the invention is applied.

Referring first to FIG. 1, there is shown the whole arrangement of a fuel supply control system for an internal combustion engine, which is adapted to carry out the method according to the invention. In the figure, reference numeral 1 designates an internal combustion engine of DOHC in-line 4 cylinder type for automotive vehicles, in which two pairs of inlet and exhaust valves are provided for each cylinder. Connected to the cylinder block of the engine 1 is an intake pipe 2 across which is arranged a throttle body 3 accommodating a throttle valve 3' therein. A throttle valve opening ($\theta_{TH}$) sensor 4 is connected to the throttle valve 3' for generating an electric signal indicative of the sensed throttle valve opening and supplying same to an electronic control unit (hereinafter called "the ECU") 5.

Fuel injection valves 6, only one of which is shown, are inserted into the interior of the intake pipe at locations intermediate between the cylinder block of the engine 1 and the throttle valve 3' and slightly upstream of respective intake valves, not shown. The fuel injection valves 6 are connected to a fuel pump, not shown, and electrically connected to the ECU 5 to have their valve opening periods controlled by signals therefrom.

Ignition plugs 22 provided for respective cylinders of the engine 1 are connected via a driving circuit 21 to the ECU 5 which controls the ignition timing $\theta ig$ of the ignition plugs 22.

Further, an electromagnetic valve 23 for valve timing changeover control, described hereinafter, is connected to the output side of the ECU 5 which controls opening and closing of the electromagnetic valve 23.

On the other hand, an intake pipe absolute pressure ($P_{BA}$) sensor 8 is provided in communication with the interior of the intake pipe 2 at a location immediately downstream of the throttle valve 3' for supplying an electric signal indicative of the sensed absolute pressure within the intake pipe 2 to the ECU 5. An intake air temperature ($T_A$) sensor 9 is inserted into the intake pipe 2 at a location downstream of the intake pipe absolute pressure sensor 8 for supplying an electric signal indicative of the sensed intake air temperature $T_A$ to the ECU 5.

An engine coolant temperature ($T_W$) sensor 10, which may be formed of a thermistor or the like, is mounted in the cylinder block of the engine 1, for supplying an electric signal indicative of the sensed engine coolant temperature $T_W$ to the ECU 5. An engine rotational speed (Ne) sensor 11 and a cylinder-discriminating (CYL) sensor 12 are arranged in facing relation to a camshaft or a crankshaft, not shown, of the engine 1. The engine rotational speed sensor 11 generates a pulse as a TDC signal pulse at each of predetermined crank angles whenever the crankshaft rotates through 180 degrees, while the cylinder-discriminating sensor 12 generates a pulse at a predetermined crank angle of a particular cylinder of the engine, both of the pulses being supplied to the ECU 5.

A three-way catalyst 14 is arranged within an exhaust pipe 13 connected to the cylinder block of the engine 1 for purifying noxious components such as HC, CO, and NOx. An O$_2$ sensor 15 as an exhaust gas ingredient concentration sensor is mounted in the exhaust pipe 13 at a location upstream of the three-way catalyst 14, for sensing the concentration of oxygen present in exhaust gases emitted from the engine 1 and supplying an electric signal indicative of the sensed oxygen concentration to the ECU 5.

Further electrically connected to the ECU 5 are a vehicle speed sensor 16, a gear position sensor 17 for detecting the shift lever position of a transmission, and an oil pressure sensor 18 for detecting oil pressure in oil feeding passages (88i, 88e in FIG. 2), referred to hereinafter, of the engine 1. Signals from these sensors are supplied to the ECU 5.

The ECU 5 comprises an input circuit 5a having the functions of shaping the waveforms of input signals from various sensors, shifting the voltage levels of sensor output signals to a predetermined level, converting analog signals from analog-output sensors to digital signals, and so forth, a central processing unit (hereinafter called "the CPU") 5b, memory means 5c storing various operational programs which are executed in the CPU 5b and for storing results of calculations therefrom, etc., and an output circuit 5d which outputs driving signals to the fuel injection valves 6, the driving circuit 21, and the electromagnetic valve 23.

The CPU 5b operates in response to the above-mentioned signals from the sensors to determine operating conditions in which the engine 1 is operating such as an air-fuel ratio feedback control region for controlling the air-fuel ratio in response to oxygen concentration in exhaust gases and open-loop control regions, and calculates, based upon the determined operating conditions, the valve opening period or fuel injection period $T_{OUT}$ over which the fuel injection valves 6 are to be opened, by the use of the following equation in synchronism with inputting of TDC signal pulses to the ECU 5.

$$T_{OUT} = T_i \times K_{WOT} \times K_1 + K_2 \tag{1}$$

where Ti represents a basic fuel amount, more specifically a basic fuel injection period of the fuel injection valves 6, which is determined based upon the engine rotational speed Ne and the intake pipe absolute pressure $P_{BA}$. As the Ti map for determining the Ti value, a $Ti_L$ map for low speed valve timing and a $Ti_H$ map for high speed valve timing are stored in the memory means 5C.

$K_{WOT}$ represents a high load enriching coefficient for increasing the amount of fuel in a predetermined high load engine operating region.

$K_1$ and $K_2$ represent other correction coefficients and correction variables, respectively, which are calculated based on various engine parameter signals to such values as to optimize operating characteristics of the engine such as fuel consumption and accelerability, depending on operating conditions of the engine.

The CPU 5b decides the ignition timing $\theta$ig based on the engine rotational speed Ne and the intake pipe absolute pressure $P_{BA}$. As the $\theta$ig map for determining the ignition timing, similarly to the Ti maps, a $\theta$ig$_L$ map for the low speed valve timing and a $\theta$ig$_H$ map for the high speed valve timing are stored in the memory means 5C.

Further, the CPU 5b generates an instruction signal for changing the valve timing in manners described hereinafter with reference to FIGS. 9, 13, and 16 to thereby control the opening and closing of the electromagnetic valve 23.

The CPU 5b supplies the output circuit 5d with driving signals for driving the fuel injection valves 6, the driving circuit 21, and the electromagnetic valve 23, based upon the results of the above calculations and decisions.

Figure 2:
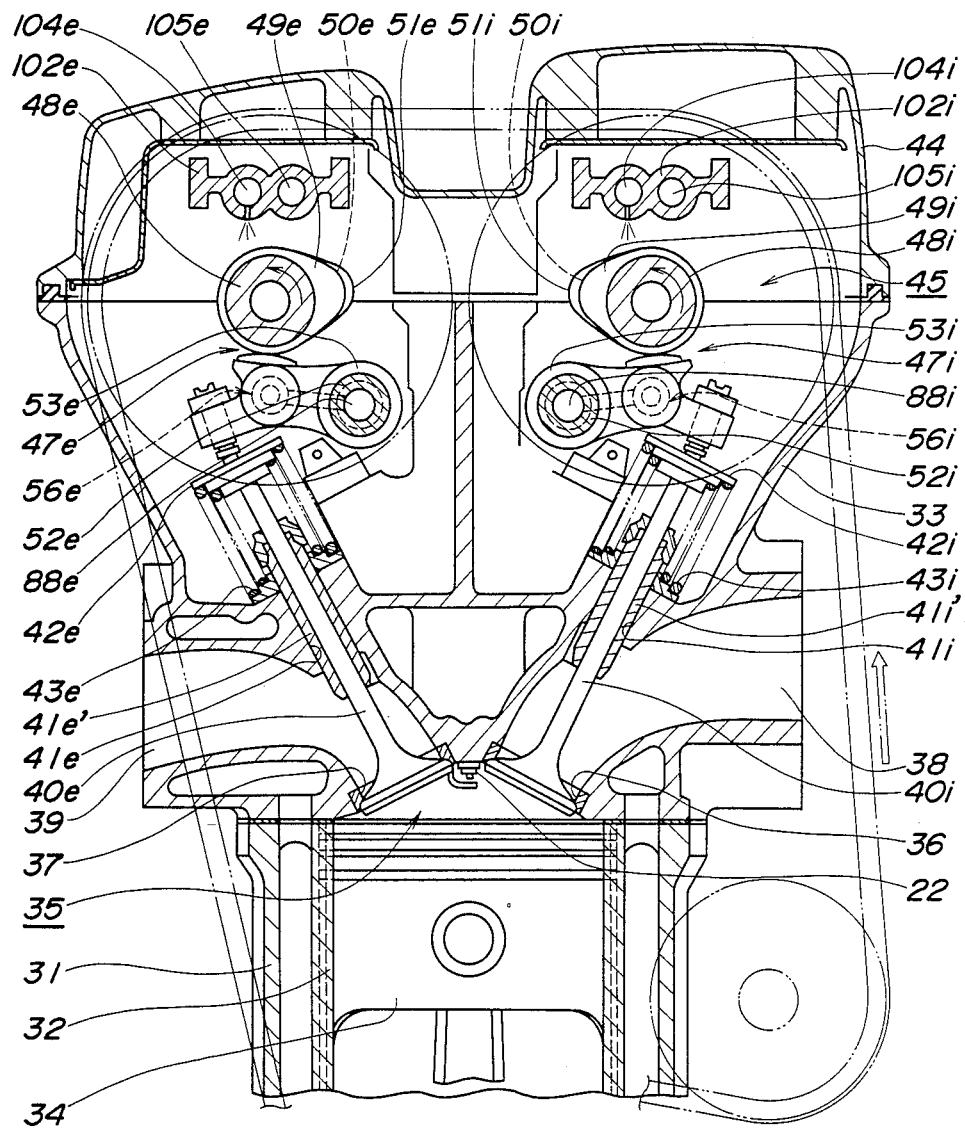
FIG. 2 is a longitudinal cross-sectional view of essential parts of the engine.

FIG. 2 shows a longitudinal cross-section of essential parts of the engine 1. Four cylinders 32 only one of which is shown, are serially arranged within a cylinder block 31. Combustion chambers 35 are defined between a cylinder head 33 mounted on an upper end of the cylinder block 31 and pistons 34 slidably fitted within respective cylinders 32. The cylinder head 33 has a pair of inlet ports 36 and a pair of exhaust ports 37 formed in a portion thereof serving as a ceiling of each combustion chamber. Each inlet port 36 is connected to an inlet passage 38 which opens in one side wall of the cylinder head 33, while each exhaust port 37 is connected to an exhaust passage 39 which opens in another side wall of the cylinder head 33.

An inlet valve 40i is arranged in each inlet part 36 to open and close same, while an exhaust valve 40e is arranged in each exhaust port 37 to open and close same. The inlet valves 40i and exhaust valves 40e are guided by respective guide sleeves 41i' and 41e' which are fitted in respective guide holes 41i and 41e formed in the cylinder head 33. Valve springs 43i, 43e are interposed between respective valve seats formed at ends of the guide holes 41i, 41e and respective collars 42i, 42e secured on upper ends of each inlet valve 40i and each exhaust valve 40e projected from the respective guide holes 41i, 41e. The valve springs 43i, 43e urge the respective inlet and exhaust valves 40i, 40e in the upward or valve-closing direction.

The cylinder head 33 and a head cover 44 mounted on an upper end thereof define therebetween a working chamber 45 which accommodates an inlet valve-operating device 47i for opening and closing the inlet valve 40i in each cylinder 32, and an exhaust valve-operating device 47e for opening and closing the exhaust valve 40e in same. The valve-operating devices 47i, 47e are basically of the same construction. Therefore, only the component parts of the inlet valve-operating device 47i will be described below with reference numerals having a letter i affixed thereto, while those of the exhaust valve-operating device 47e are merely shown in the drawings with corresponding reference numerals having a letter e affixed thereto.

Figure 3:
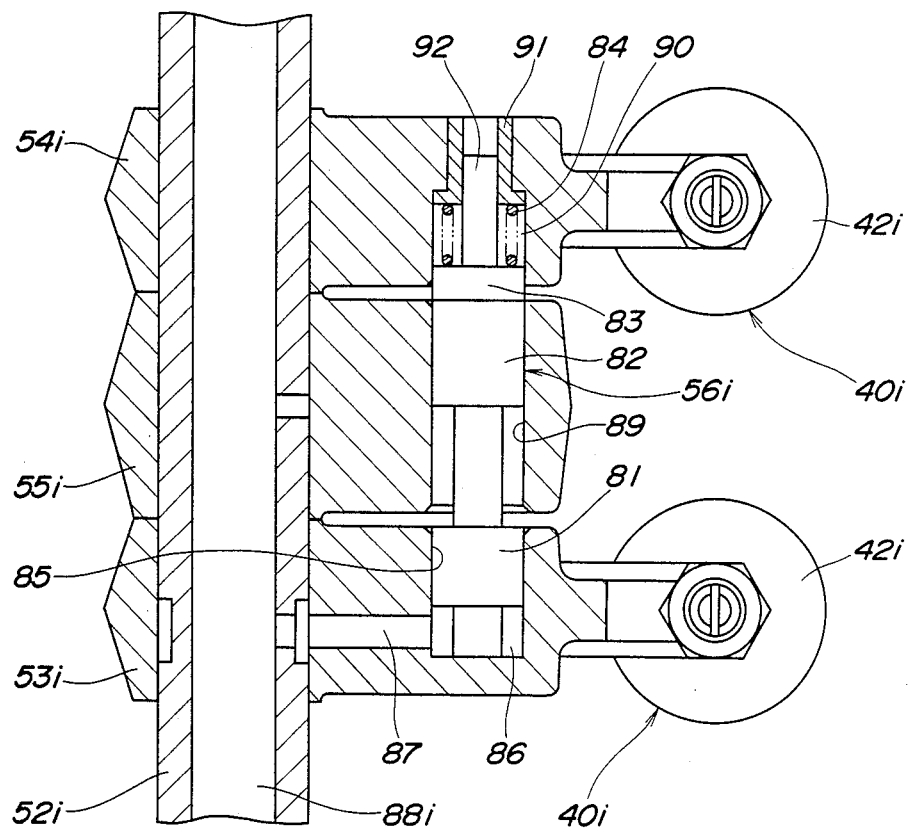
FIG. 3 is a transverse cross-sectional view of a connection-changeover mechanism.

Referring also to FIG. 3, the inlet valve-operating device 47i comprises a camshaft 48i rotatively driven by a crankshaft, not shown, at a speed ratio of ½, a high speed cam 51i and low speed cams 49i, 50i secured on the camshaft 48i, provided for each cylinder 32 (the low speed cam 50i has substantially the same configuration as the low speed cam 49i, both being arranged on opposite sides of the high speed cam 51i), a rocker shaft 52i extending parallel with the camshaft 48i, first and second driving rocker arms 53i and 54i, and a free rocker arm 55i pivotally mounted on the rocker shaft 52i, the three arms being provided for each cylinder 32, a connection-changeover mechanism 56i arranged in the corresponding rocker arms 53i, 54i, 55i for each cylinder.

As shown in FIG. 3, the connection-changeover mechanism 56i comprises a first changeover pin 81 capable of connecting the first driving rocker arm 53i with the free rocker arm 55i, a second changeover pin 82 capable of connecting the second driving rocker arm 54i with the free rocker arm 55i, a restriction pin 83 for restricting the movement of the first and second changeover pins 81, 82, and a spring 84 urging the pins 81, 82, 83 in the rocker arms-disconnecting direction.

The first driving rocker arm 53i is formed therein with a first guide bore 85 extending parallel with the rocker shaft 52i with one end thereof closed and the other end opening in a side face thereof facing the free rocker arm 55i. The first changeover pin 81 is slidably fitted in the first guide bore 85, defining an oil hydraulic chamber 86 between one end thereof and the closed end of the first guide bore 85. Further, a passage 87 extends from the oil hydraulic chamber 86 and opens into an oil feeding passage 88i formed in the rocker shaft 52i so that the passage 88i permanently communicates via the passage 87 with the oil hydraulic chamber 86 irrespective of rocking motion of the first driving rocker arm 53i.

The free rocker arm 55i is formed therein with a guide through hole 89 at a location corresponding to the first guide bore 85, which extends through the free rocker arm 55i and parallel with the rocker shaft 52i. The second changeover pin 82 is slidably fitted in the guide through hole 89, with one end thereof abutting on an opposed end face of the first changeover pin 81.

The second driving rocker arm 54i is formed therein with a second guide bore 90 at a location corresponding to the guide through hole 89, which extends parallel with the rocker shaft 52i with one end thereof opening toward the free rocker arm 55i. The restriction pin 83 in the form of a disc is slidably fitted in the second guide bore 90, in a fashion abutting on the other end of the second changeover pin 82. Further, the second guide bore 90 has a guide sleeve 91 fitted therein, in which is slidably fitted an axial rod 92 which coaxially and integrally projects from the restriction pin 82. The spring 84 is interposed between the guide sleeve 91 and the restriction pin 83 and urges the pins 81, 82, 83 toward the oil hydraulic chamber 86.

In the connection-changeover mechanism 56i constructed as above, when the pressure in the oil hydraulic chamber 86 is increased, the first changeover pin 81 is forced to move into the guide through hole 89 and at the same time the second changeover pin 82 is urgedly moved into the second guide bore 90 to connect the rocker arms 53i, 55i, 54i together. When the pressure in the oil hydraulic chamber 86 is decreased, the first changeover pin 81 is moved back by the urging force of the spring 84 into a position in which the end face thereof abutting on the second changeover pin 82 corresponds in location to the space between the first driving rocker arm 53i and the free rocker arm 55i, and at the same time the second changeover pin 82 is moved back into a position in which the end face thereof abutting on the restriction pin 83 corresponds in location to the space between the free rocker arm 55i and the second driving rocker arm 54i, whereby the rocker arms 53i, 55i, 54i become disconnected from each other.

Figure 4A:
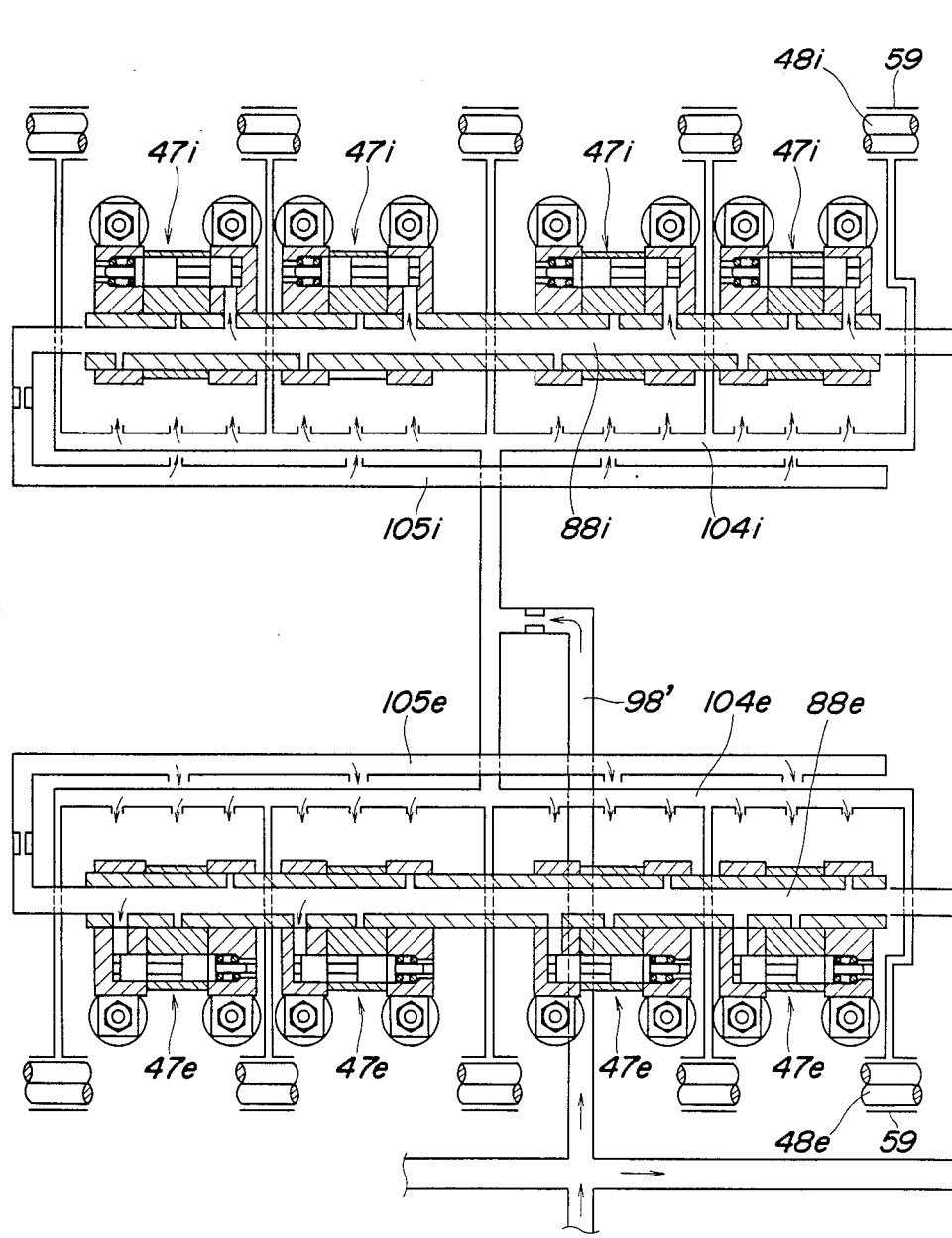

Next, the oil-feeding system for supplying oil to the valve-operating devices 47i, 47e will be described with reference to FIG. 4. Oil galleries 98, 98' are connected to an oil pump, not shown, for pumping oil from an oil pan, not shown. From the oil galleries 98, 98', oil pressure is supplied to the connection-changeover mechanisms 56i, 56e, while lubricating oil is supplied to the lubricating parts of the valve-operating devices 47i, 47e.

Connected to the oil gallery 98 is a selector valve 99 for changing the oil pressure supplied between high and low levels. The oil feeding passages 88i, 88e in the respective rocker shafts 52i, 52e are connected via the selector valve 99 with the oil gallery 98.

Passage-forming members 102i, 102e respectively extend parallel with the camshafts 48i, 48e and are secured to upper surfaces of cam holders 59 by means of a plurality of bolts. The passage-forming members 102i, 102e are formed therein with respective low speed lubricating oil passages 104i, 104e, and high speed lubricating oil passages 105i, 105e, all of which have opposite closed ends and form pairs of parallel passages. The low speed lubricating oil passages 104i, 104e are connected to the oil gallery 98', and the high speed lubricating oil passages 105i, 105e are connected to the oil feeding passages 88i, 88e. Further, the low speed lubricating oil passages 104i, 104e are connected to the cam holder 59.

The selector valve 99 comprises an oil inlet port 119 connected to the oil gallery 98, an oil outlet port 120 connected to the oil feeding passages 88i, 88e, and a spool valve 122 slidably fitted within a housing 121 mounted on one end face of the cylinder head 33.

The housing 121 is formed therein with a cylinder hole 124 having an upper end thereof closed with a cap 123, and within which is fitted the spool valve 122 to define an operating oil hydraulic chamber 125 between an upper end thereof and the cap 123. Further, a spring 127 is accommodated within a spring chamber 126 defined between the spool valve 122 and a lower part of the housing 121 and urges the spool valve 122 in the upward or valve-closing direction. The spool valve 122 has an annular recess 128 formed therearound for communicating between the oil inlet port 119 and the oil outlet port 120. When the spool valve is in an upper position as shown in FIG. 4, it cuts off the communication between the oil inlet port 119 and the oil outlet port 120.

An oil filter 129 is held between the oil inlet port 119 and a high speed oil pressure feeding passage 116. Further, the housing 121 has a restriction passage 131 formed therein, which provides communication between the oil inlet port 119 and the oil outlet port 120. Therefore, even when the spool valve 122 is in a closed position, the oil inlet port 119 and the oil outlet port 120 are communicated with each other through the restriction passage 131 whereby oil pressure decreased through the restriction passage 131 is supplied via the oil outlet port 120 to the oil feeding passages 88i, 88e.

The housing 121 also has a bypass port 132 formed therein, which is disposed to communicate via the annular recess 128 with the oil outlet port 120 only when the spool valve 122 is in the closed position. The bypass port 132 communicates with the interior of the cylinder head 33 at an upper location thereof.

Connected to the housing 121 is a conduit line 135 which always communicates with the oil inlet port 119. The conduit line 135 is connected via the electromagnetic valve 23 with a conduit line 137 which is in turn connected with a communication hole 138 formed in the cap 123. Therefore, when the electromagnetic valve 23 is opened, oil pressure is supplied to the operating oil hydraulic chamber 125 to thereby move the spool valve 122 in the valve-opening direction.

Further, the housing 121 has the oil pressure sensor 18 mounted thereon for detecting the oil pressure in the oil outlet port 120, i.e. the oil pressure in oil feeding passages 88i, 88e, to determine whether the selector valve 99 is normally functioning or not.

The operation of the valve-operating devices 47i, 47e having the above-described construction will be described below. Since the valve-operating devices 47i, 47e operate similarly to each other, the following description refers only to the operation of the inlet valve-operating device 47.

When the ECU 5 sends out a valve-opening instruction signal to the electromagnetic valve 23, the electromagnetic valve 23 is opened to thereby cause the selector valve 99 to open, so that the oil pressure in the oil feeding passage 88i is increased. This causes the connection-changeover mechanism 56i to operate to connect the rocker arms 53i, 54i, 55i together, whereby the high speed cam 51i operates the rocker arms 53i, 54i, 55i in unison to cause each pair of inlet valves 40i to open and close at high speed valve timing in which the valve-opening period and the valve lift amount are relatively greater.

On the other hand, when the ECU 5 supplies a valve-closing instruction signal to the electromagnetic valve 23, the electromagnetic valve 23 and in turn the selector valve 99 are closed to thereby decrease the oil pressure in the oil feeding passage 88i. This causes the connection-changeover mechanism 56i to operate to disconnect the rocker arms 53i, 54i, 55i from each other, whereby the low speed cams 49i, 50i operate the corresponding rocker arms 53i, 54i to cause the pair of inlet valves 40i to open and close at low speed valve timing in which the valve-opening period and the valve lift amount are relatively smaller.

Next, the valve timing-changeover control according to the invention will be described below.

Figure 5:
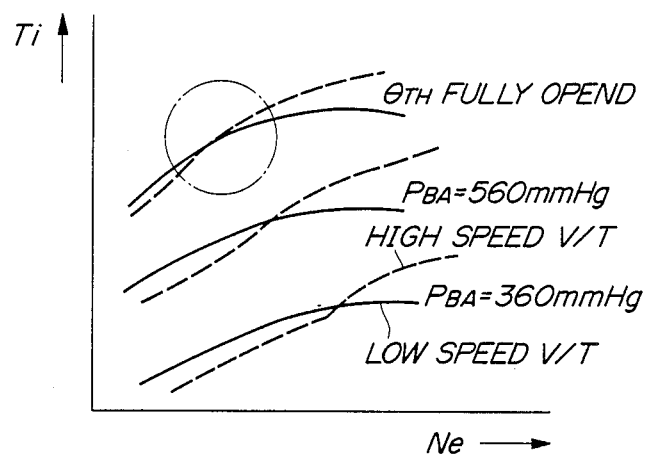
FIG. 5 is a diagram showing set basic fuel injection period characteristics for low speed valve timing and high speed valve timing.

In FIG. 5, the Ti value of the $Ti_L$ map for low speed valve timing and that of the $Ti_H$ map for high speed valve timing are respectively indicated by solid lines and dotted lines. As is clear from the figure, in the case of the low speed valve timing being selected, the rate of increase in the intake air amount becomes smaller with increase in the engine rotational speed Ne, while in the case of the high speed valve timing being selected, the charging efficiency becomes higher with increase in the engine rotational speed Ne whereby the intake air amount becomes greater than in the case of the low speed valve timing being selected. Therefore, there is a point of engine rotational speed Ne where the Ti value for low speed valve timing and the Ti value for high speed valve timing are identical to each other. In this point of Ne, in both cases of the high and low speed valve timings being selected, the intake air amount is identical, and at the same time the air-fuel ratio is also identical, so that the engine output becomes substantially identical.

Figure 6:
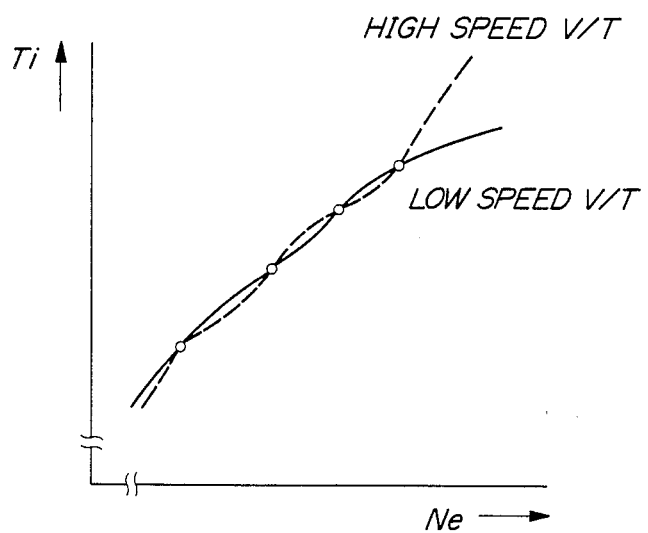
FIG. 6 is an enlarged view of a portion encircled in FIG. 5.

The charging efficiency finely varies with the engine rotational speed Ne, and particularly in the vicinity of the maximum throttle valve opening ($\theta$th), the variation becomes markedly great. FIG. 6 shows on an enlarged scale part of FIG. 5 for explaining this variation. At a plurality of points, the Ti value for low speed valve timing and that for high speed valve timing become identical to each other. As described hereinafter, when the valve timing is changed at a point where the Ti value for low speed valve timing and that for high speed valve timing are identical to each other, hunting in changeover the valve timing, i.e. frequent changeover of valve timing, is liable to occur in the region of wide throttle valve opening (WOT), which adversely affects the durability of the connection-changeover mechanisms 56i, 56e.

Figure 7:
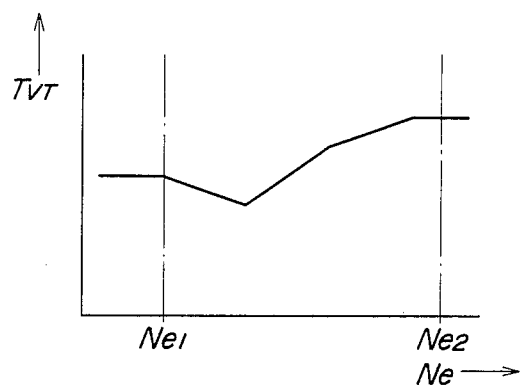
FIG. 7 is a diagram showing a $T_{VT}$ table.

In this connection, when the engine is in a high load operating region (maximum $\theta$th (WOT) region), the air-fuel ratio is enriched by the high load enriching coefficient $K_{WOT}$ to increase the engine output. In such a high load operating region, the engine output can be more effectively increased if the valve timing is changed to the high speed valve timing. Therefore, when the engine is in the high load operating region (maximum $\theta$th (WOT) region), from a $T_{VT}$ table in which a high load determination value $T_{VT}$ experimentally obtained based on the fuel injection amount $T_{OUT}$ is set in relation to the engine rotational speed Ne as shown in FIG. 7, a $T_{VT}$ value is obtained in accordance with the engine rotational speed Ne, and when the fuel injection amount $T_{OUT}$ is equal to or higher than the $T_{VT}$ value, the valve timing is changed to the high speed valve timing. In this case, if it is arranged that the region defined by $T_{OUT} \geq T_{VT}$ includes the aforesaid points in the wide throttle valve opening region where the Ti value for low speed valve timing and that for high speed valve timing are identical to each other, the hunting in the valve timing can be prevented. In addition, the $T_{VT}$ table used for vehicles with automatic transmissions is different from that used for vehicles with manual transmissions.

Further, generally, in order to prevent overspeed of the engine, fuel cut is carried out when the engine rotational speed Ne exceeds a predetermined value (so-called revolution limitter value) $N_{HFC}$. Load acting on a timing belt connecting between the crankshaft and the camshaft increases with decrease in the opening period of the valve because the acceleration of opening movement of the valve increases with decrease in the valve opening period. Further, as the acceleration increases, a critical value of the engine rotation speed above which there can occur jumping of the valve decreases. Therefore, the maximum allowable engine rotational speed should be different between when the valve timing is set to the low speed valve timing in which the valve opening period is shorter and when the valve timing is set to the high speed valve timing in which the valve opening period is longer. Accordingly, in this embodiment, the revolution limitter value is set at a relatively low value $N_{HFC1}$ (e.g. 7500 rpm) for the low speed valve timing, and at a relatively high value $N_{HFC2}$ (e.g. 8100 rpm) for the high speed valve timing.

Figure 8:
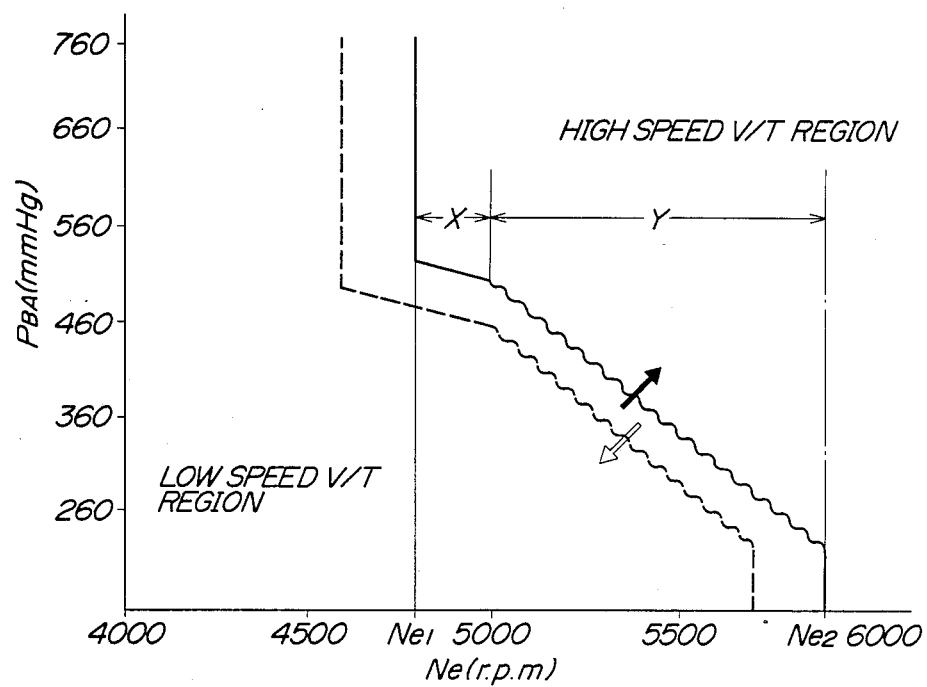
FIG. 8 is a diagram showing lower speed and higher speed valve timing regions.

Next, reference is made to FIG. 8 showing the valve timing regions. In the figure, the solid line indicates a boundary line between the low speed valve timing region and the high speed valve timing region, which is selected when the valve timing is changed from the low speed valve timing to the high speed valve timing, and the broken line indicates one which is selected when the valve timing is changed from the high speed valve timing to the low speed valve timing.

The changeover of the valve timing is carried out in a region between a value $Ne_1$ of the engine rotational speed below which the engine output obtained by the low speed valve timing always exceeds the engine output obtained by the high speed valve timing and a value $Ne_2$ of the engine rotational speed above which the engine output obtained by the high speed valve timing always exceeds the engine output obtained by the low speed valve timing. In this embodiment, hysteresis is imparted to the engine rotational speed values $Ne_1$ and $Ne_2$ between changeover of the valve timing from the low speed valve timing to the high speed valve timing and vice versa such that $Ne_1$ is set to e.g. 4,800 rpm/4,600 rpm and $Ne_2$ is set to e.g. 5,900 rpm/5,700 rpm.

In FIG. 8, X indicates a region in which the engine is in a high load operating region and the changeover of valve timing is carried out by comparison between $T_{OUT}$ and $T_{VT}$, and Y indicates a region in which the changeover of the valve timing is carried out by comparison between a $T_{IL}$ value for the low speed valve timing and a $T_{IH}$ value for the high speed valve timing. Incidentally, since the changeover characteristic in the region X is also under the influence of parameters other than the engine rotational speed Ne and the intake pipe absolute pressure $P_{BA}$ used for calculation of $T_{OUT}$, the changeover characteristic cannot be accurately plotted in FIG. 8 in which the engine rotational speed Ne is indicated by the abscissa and the intake pipe absolute pressure $P_{BA}$ is indicated by the ordinate. Therefore, the changeover characteristic in the region X of FIG. 8 should be taken as one for mere understanding of the concept of the invention.

Figure 9A:
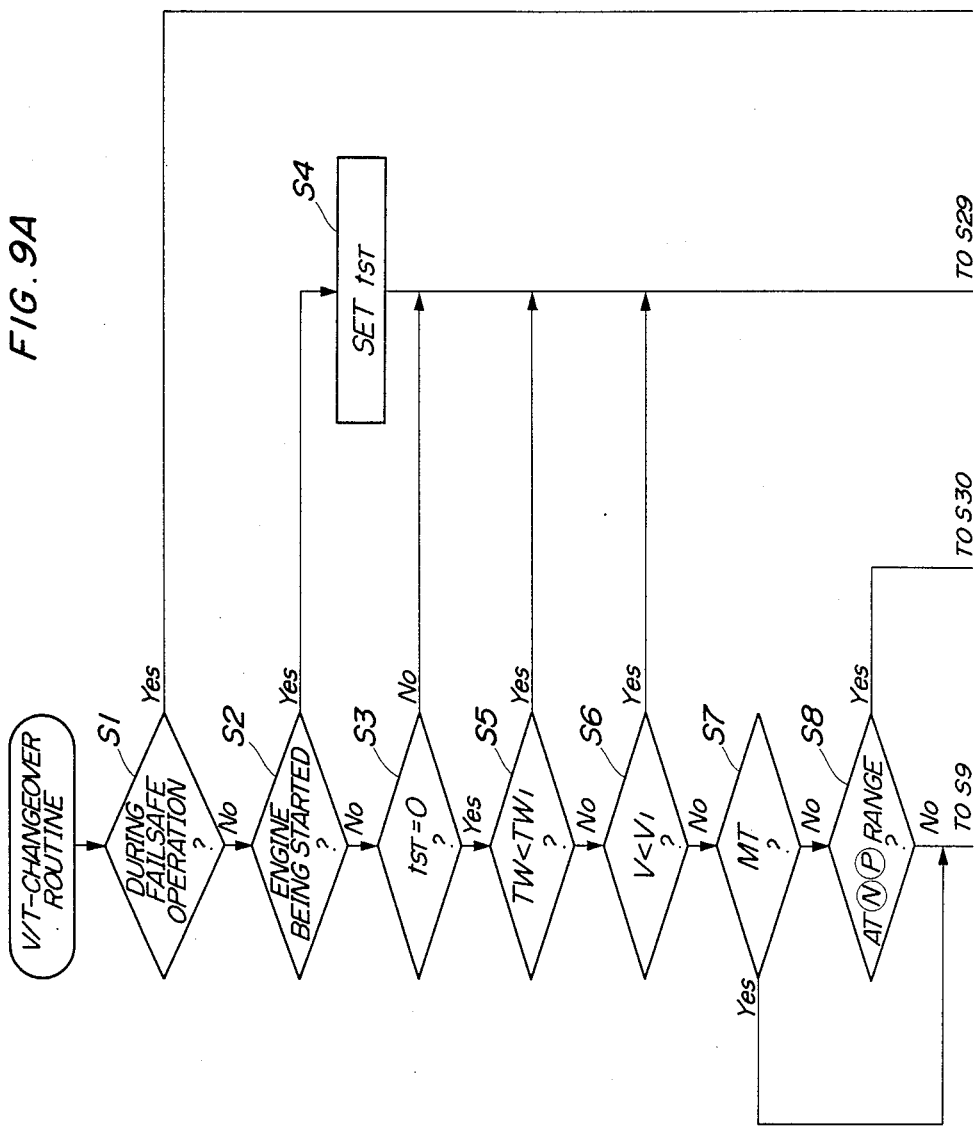
Figure 9B:
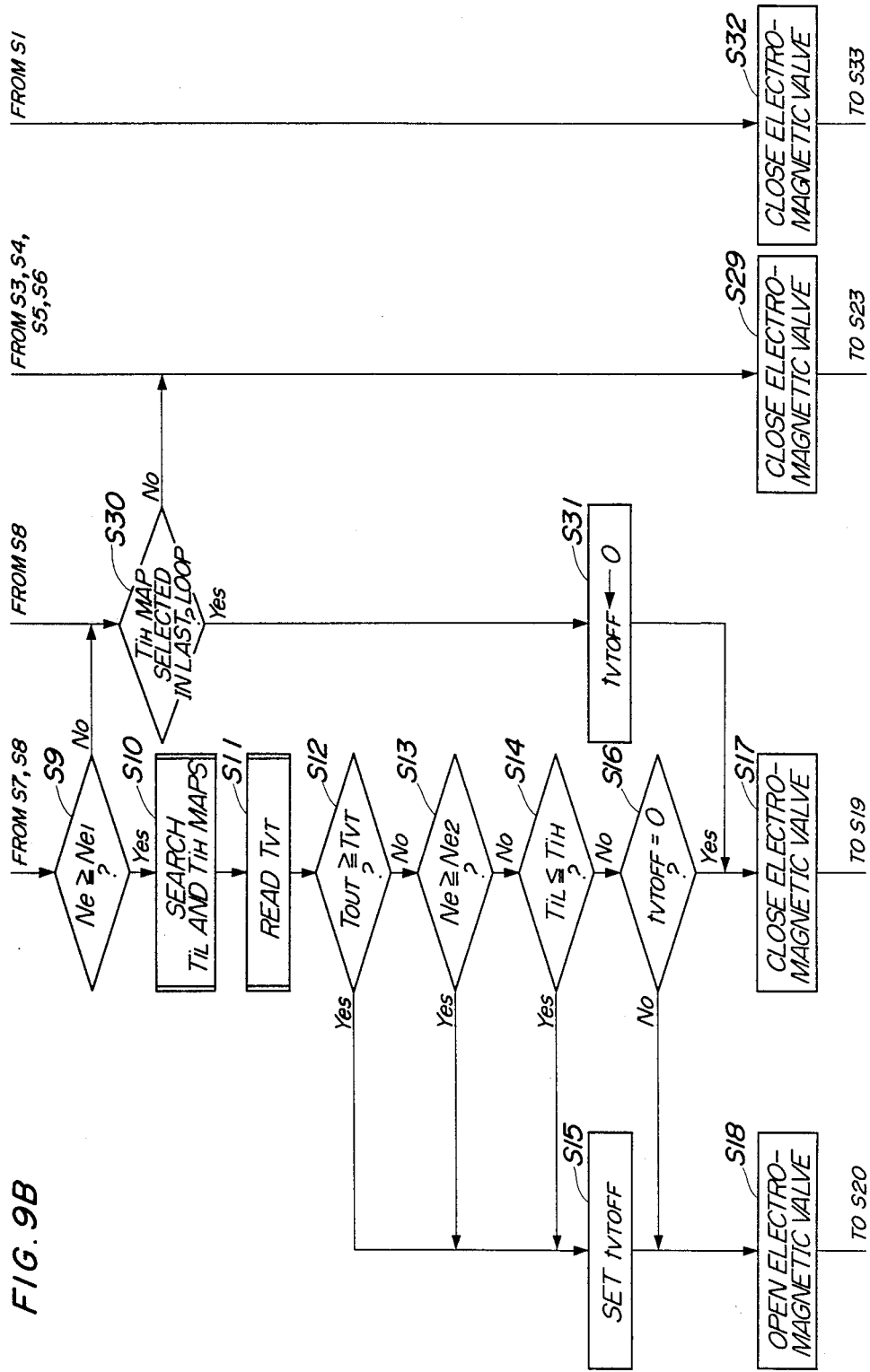

Next, reference is made to FIG. 9 to explain a program for controlling the changeover of the valve timing executed by the ECU 5, i.e. a program for output control of signals supplied to the electromagnetic valve 23. This program is executed upon generation of each pulse of the TDC signal and in synchronism therewith.

At a step S1, it is determined whether or not a failsafe operation should be carried out, e.g. by determining whether or not any engine operating parameter sensor is normally functioning or whether or not abnormality has occurred in the control system other than such sensor.

Specifically, it is determined that the engine is in an operating condition in which a failsafe operation should be carried out, if, for example, there is detected an abnormality in any of the outputs from the intake pipe absolute pressure ($P_{BA}$) sensor 8, the cylinder-discriminating (CYL) sensor 12, the engine rotational speed (TDC) sensor 11, the engine coolant temperature sensor 10, and the vehicle speed sensor 16, an abnormality in outputting of a control signal for ignition timing or in outputting of driving signals for the fuel injection valves, an abnormality in the amount of electric current supplied to the electromagnetic valve 23 for the valve timing control, or an abnormality that a normal change has not been detected in oil pressure at the oil outlet port 120 responsive to opening and closing of the electromagnetic valve 23 for the valve timing control by an oil pressure switch of the oil pressure sensor 18, over a predetermined time period. In addition, when one of the CYL sensor and the TDC sensor is abnormal, the other is used in place thereof.

If the answer to the question of the step S1 is Yes, i.e. if the failsafe operation should be carried out, the program proceeds to a step S32, referred to hereinafter, and if the answer is No, the program proceeds to a step S2.

At the step S2, it is determined whether or not the engine is being started, from the engine rotational speed Ne, etc., and at a step S3, it is determined whether or not a delay timer has counted up a predetermined time period (e.g. 5 seconds) $t_{ST}$. If the answer to the question of the step S2 is Yes, the program proceeds to a step S4, where the timer is set to the predetermined time period $t_{ST}$ for starting to count same after the engine starting has been completed. At a step S5, it is determined whether or not the engine coolant temperature $T_W$ is lower than a predetermined value $T_{W1}$ (e.g. 60° C.), i.e. whether or not the engine is in warming-up operation. At a step S6, it is determined whether or not the vehicle speed V is lower than a very low predetermined value $V_1$ (with hysteresis, e.g. 8 km/5 km). At a step S7, it is determined whether or not the vehicle on which the engine is installed is provided with a manual transmission (MT). At a step S8, it is determined, when the vehicle is an automatic transmission type (AT), whether or not the shift lever is positioned in the parking range (P) or the neutral range (N). At a step S9, it is determined whether or not the engine rotational speed Ne is not lower than the predetermined lower limit value $Ne_1$ (e.g. 4,800 rpm/4,600 rpm). If as a result of the above determinations, the failsafe operation is being carried out (the answer to the question of the step S1 is Yes), or if the engine is being started (the answer to the question of the step S2 is Yes), or if the predetermined time period $t_{ST}$ has not elapsed after the enginer has completed starting (the answer to the question of the step S3 is No), or if the engine is still in warming up operation (the answer to the question of the step S5 is Yes), or if the vehicle is standing or moving slowly (the answer to the question of the step S6 is Yes), or if the shift lever is in the P or N range (the answer to the question of the step S8 is Yes), or if $Ne<Ne_1$ (the answer to the question of the step S9 is No), the electromagnetic valve 23 is closed to maintain the low speed valve timing.

If it is determined at the step S9 that $Ne \geq Ne_1$ is satisfied, at a step S10, from the $Ti_L$ map and the $Ti_H$ map, there are obtained a Ti value (hereinafter referred to as "$Ti_L$") of the $Ti_L$ map and a Ti value (hereinafter referred to as "$Ti_H$") of the $Ti_H$ map each corresponding to the engine rotational speed Ne and the intake air absolute pressure $P_{BA}$. Then, at a step S11, from the $T_{VT}$ table set depending on whether the vehicle is AT or MT is obtained a high load determination value $T_{VT}$ corresponding to the engine rotational speed Ne. At a step S12, the $T_{VT}$ is compared with the $T_{OUT}$ in the immediately preceding loop to determine whether $T_{OUT} \geq T_{VT}$ is satisfied, i.e. whether the engine is in the high load operating condition in which the air-fuel ratio should be enriched. If the step S12 is No, i.e. if $T_{OUT}<T_{VT}$ is satisfied, the program proceeds to a step S13, where it is determined whether or not the engine rotational speed Ne is not lower than the predetermined upper limit value $Ne_2$. If the answer to the question of the step S13 is No, i.e. if $Ne<Ne_2$ is satisfied, the program proceeds to a step S14, where the $Ti_L$ and the $Ti_H$ obtained at the step S10 are compared with each other. If $Ti_L>Ti_H$ is satisfied, it is determined at a step S16 whether or not a timer value $t_{VTOFF}$ of a delay timer set at a step S15, referred to hereinafter, has been counted up. If the answer to the question of the step S16 is Yes, an instruction signal for closing the electromagnetic valve 23, i.e. an instruction for changing the valve timing to the low speed valve timing, is generated at a step S17. On the other hand, if any of $T_{OUT} \geq T_{VT}$, $Ne \geq Ne_2$, and $Ti_L \leq Ti_H$ is satisfied, the delay timer for closing the electromagnetic valve is set to the predetermined value $t_{VTOFF}$ (e.g. 3 seconds) and started at the step S15. Then at a step S18, an instruction signal for opening the electromagnetic valve 23, i.e. an instruction for changing the valve timing to the high speed valve timing is generated.

If the valve-closing signal is generated at the step S17, it is determined at a step S19 whether or not the oil pressure switch within the oil pressure sensor 18 has been turned on, i.e. if the oil pressure in the oil feeding passages 88$i$, 88$e$ has become low. If the answer to the question of the step S19 is Yes, i.e. if the oil pressure switch has been turned on, it is determined at a step S21 whether or not a changeover delay timer has counted up a predetermined time period $t_{LVT}$ for the low speed valve timing. If the answer to the question of the step S21 is Yes, i.e. if $t_{LVT}=0$, another changeover delay timer for the high speed valve timing is set to a predetermined time period $t_{HVT}$ (e.g. 0.1 second) and started at a step S23. Then at a step S25, the $Ti_L$ map and an ignition timing map ($\theta ig_L$ map) for the low speed valve timing are selected as the Ti map and the ignition timing map to be used in a routine for fuel injection control. At the following step S27, the revolution limitter value $N_{HFC}$ is set to a predetermined value $N_{HFC1}$ for the low speed valve timing.

On the other hand, if the valve-opening signal is generated at the step S18, it is determined at a step S20 whether or not the oil pressure switch within the oil pressure sensor 18 has been turned off, i.e. if the oil pressure in the oil feeding passages 88$i$, 88$e$ has become high. If the answer to the question of the step S20 is Yes, i.e. if the oil pressure switch has been turned off, it is determined at a step S22 whether or not the changeover delay timer for the high speed valve timing has counted up the value $t_{HVT}$. If the answer to the question of the step S22 is Yes, i.e. if $t_{HVT}=0$, the the changeover delay timer for the low speed valve timing is set to a predetermined time period $t_{LVT}$ (e.g. 0.2 seconds) at a step S24, and then at a step S26, the $Ti_H$ map and an ignition timing map ($\theta ig_H$ map) for the high speed valve timing are selected as the Ti map and the ignition timing map to be used in the routine for fuel injection control. At the following step S28, the revolution limitter value $N_{HFC}$ is set to a predetermined value $N_{HFC2}$ for the high speed valve timing, which is higher than $N_{HFC1}$.

The predetermined delay time periods $t_{HVT}$ and $t_{LVT}$ are set at such values as correspond to the respective time lags, i.e. periods of time to be elapsed from opening and closing of the electromagnetic valve 23, through switching of the selector valve 99, and changing of the oil pressure in the oil feeding passages 88$i$, 88$e$, until completion of changeover operations by the connection-changeover mechanisms 56$i$, 56$e$ of all the cylinders. When the electromagnetic switch 23 is closed, the program proceeds in the order of S19 - S22 - S24 - S26 - S28 until the oil pressure switch within the oil pressure sensor 18 is turned on. After the oil pressure switch has been turned on, the program proceeds in the order of S19 - S21 - S26 - S28 until the connection-changeover mechanisms 56$i$, 56$e$ of all the cylinders have been changed over to the low speed valve timing position. Further, if the selector valve 99 is not closed due to failure of the electromagnetic valve 23 or the selector valve 99 etc. so that the oil pressure switch within the oil pressure sensor 18 remains open or off, the program also proceeds in the above-mentioned order of S19 - S22 - S24 - S26 - S28. Thus, until the connection-changeover mechanisms 56$i$, 56$e$ of all the cylinders have been changed to the low speed valve timing position, the fuel injection is controlled in a manner suitable for the high speed valve timing. Also, when the electromagnetic switch 23 is opened, the fuel injection is controlled in a manner suitable for the low speed valve timing until the connection-changeover mechanisms 56$i$, 56$e$ of all the cylinders have been changed to the high speed valve timing position.

In the meanwhile, if the engine is being started (the answer to the question of the step S2 is Yes), or if the time period $t_{ST}$ has not elapsed after completion of the engine starting (the answer to the question of the step S3 is No), or if the engine has not yet been warmed up (the answer to the question of the step S5 is Yes), or if the vehicle is standing or moving slowly (the answer to the question of the step S6 is Yes), the program proceeds to the step S29, where the instruction signal for closing the electromagnetic valve 23 is generated, followed by the program proceeding in the order of S23 - S25 - S27. If it is determined at the step S8 that the shift lever position is in the N or P range, the program proceeds to a step S30, where it is determined whether or not the $Ti_H$ map has been selected in the immediately preceding loop. Also, if it is determined at the step S9 that Ne<Ne$_1$ is satisfied, the program proceeds to the step S30. If the answer to the question of the step S30 is Yes, i.e. if the $Ti_H$ map has been selected in the immediately preceding loop, the time period $t_{VTOFF}$ of the delay timer over which the electromagnetic valve is to be opened is set to 0 at a step S31, and then the program proceeds to a step S17. If the answer to the question of the step S30 is No, i.e. if the $Ti_H$ map has not been used in the immediately preceding loop, in other words, if the connection-changeover mechanisms 56$i$, 56$e$ of all the cylinders have not been changed over to the high speed valve timing position, the program proceeds, as described above, in the order of S29 - S23 - S25 - S27, whereby the fuel injection is controlled in a manner suitable for the low speed valve timing irrespective of the state of the oil pressure switch within the oil pressure sensor 18. This is a counter-measure for the case in which the oil pressure switch within the oil pressure sensor 18 continues to be off due to disconnection in the wiring etc.

The aforesaid revolution limitter Ne value $N_{HFC1}$ is set at a value higher than Ne$_2$, and normally the valve timing is switched to the high speed valve timing and accordingly the revolution limitter $N_{HFC}$ is set to the higher vlaue $N_{HFC2}$ before the engine rotational speed Ne rises to $N_{HFC1}$, so that fuel cut is not carried out even at $N_{HFC1}$. On the other hand, when the engine is in an operating condition in which the program proceeds from any of the steps S2–S6, and S8 to the step S29, the fuel cut can be carried out at $N_{HFC1}$, since the low speed valve timing is maintained even after the engine rotational speed Ne exceeds Ne$_2$ due to racing of the engine etc. Further, even after the valve timing is switched from the low speed valve timing to the high speed valve timing, fuel cut is carried out at $N_{HFC1}$ before $t_{HVT}$ becomes 0, i.e. before the connection-changeover mechanisms 56$i$, 56$e$ are actually changed over to the high speed valve timing position.

Figure 10:
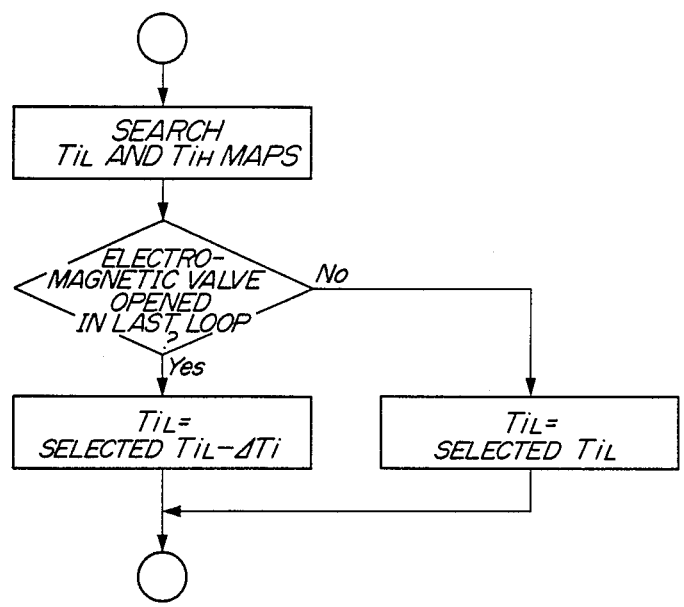
FIG. 10 is a flowchart of a subroutine for obtaining basic fuel injection period values $Ti_L$ and $Ti_H$ from respective $Ti_L$ and $Ti_H$ maps.

FIG. 10 shows the subroutine used at the step S10 for obtaining $Ti_L$ and $Ti_H$ from the respective $Ti_L$ and $Ti_H$ maps. It is determined whether or not the instruction signal for opening the electromagnetic switch 23 has been generated in the immediately preceding loop. If the instruction signal has not been generated, the $Ti_L$ to be used at the step S14 is set to a value $Ti_L$ obtained from the $Ti_L$ map, whereas if the instruction signal has been generated, the $Ti_L$ to be used at the step S14 is set to a value obtained by subtracting a predetermined hysteresis amount of $\Delta Ti$ from a valve $Ti_L$ obtained from the $Ti_L$ map. Thus, hysteresis is imparted to the changeover characteristic in the region Y in FIG. 8.

Figure 11:
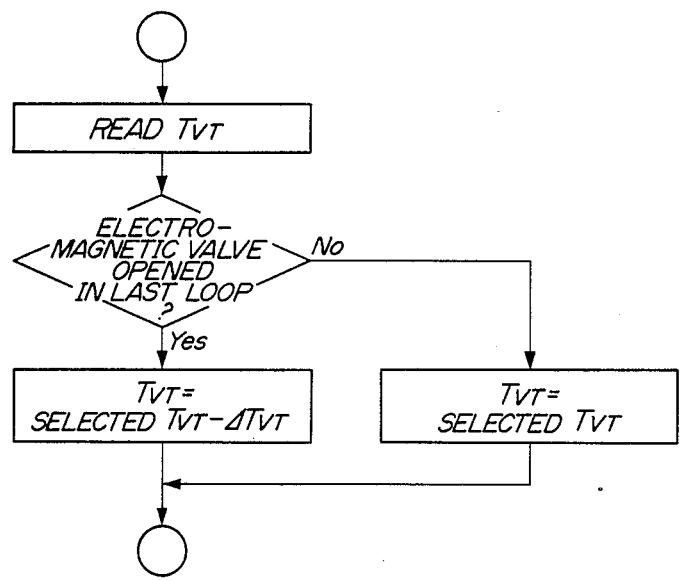
FIG. 11 is a flowchart of a subroutine for calculating a value $T_{VT}$.
Figure 12A:
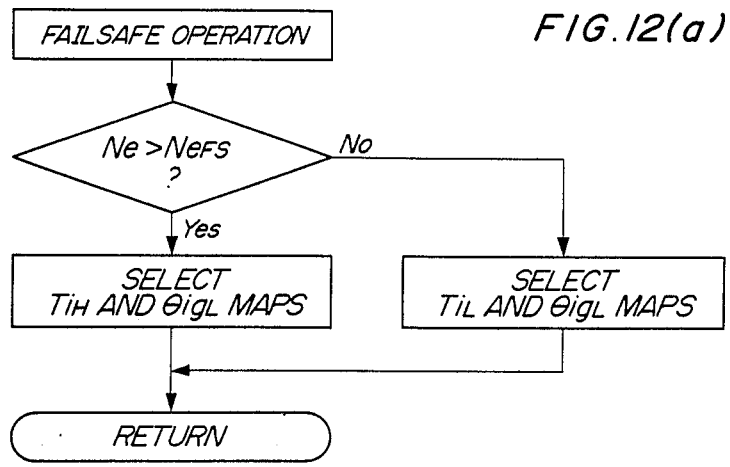
Figure 12B:
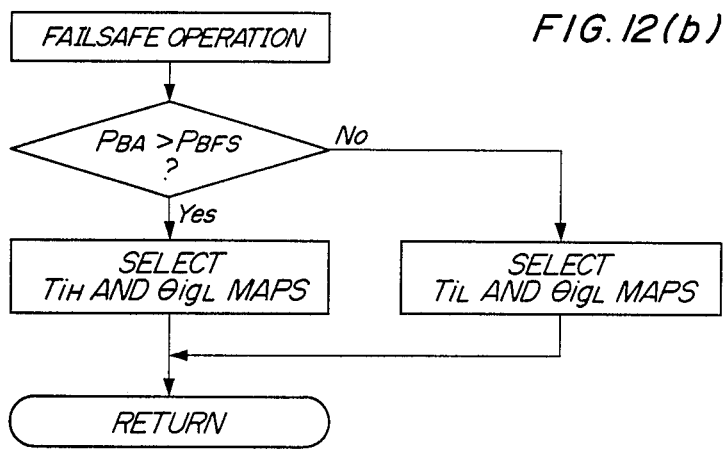
Figure 12C:
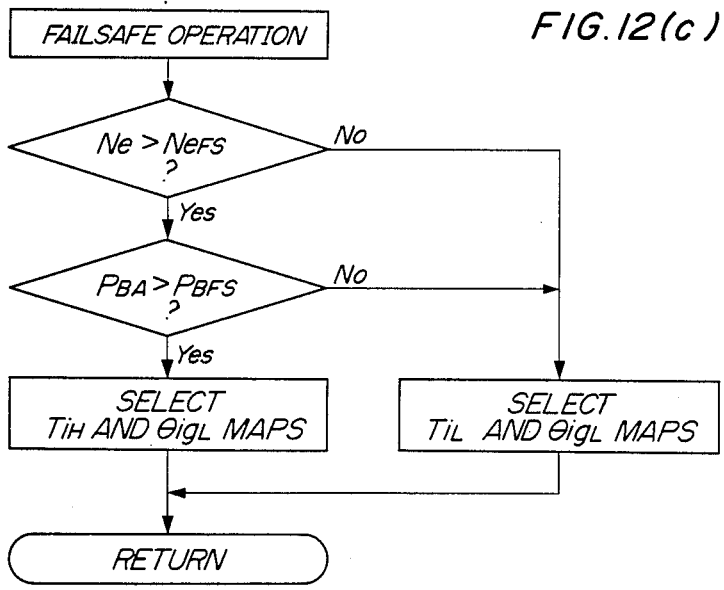
Figure 12D:
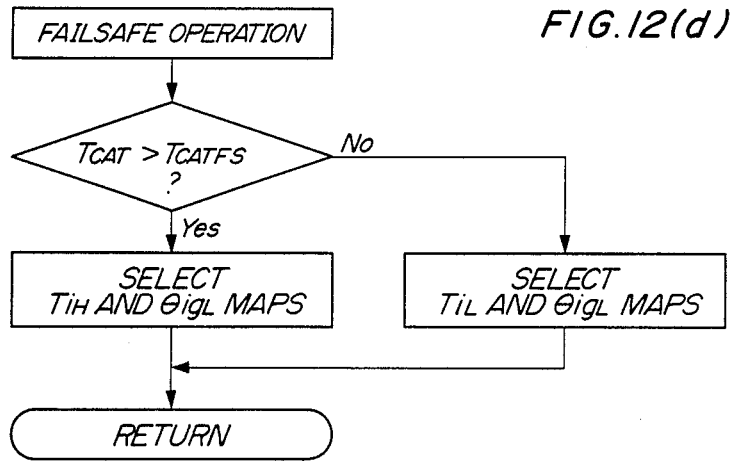
Figure 12E:
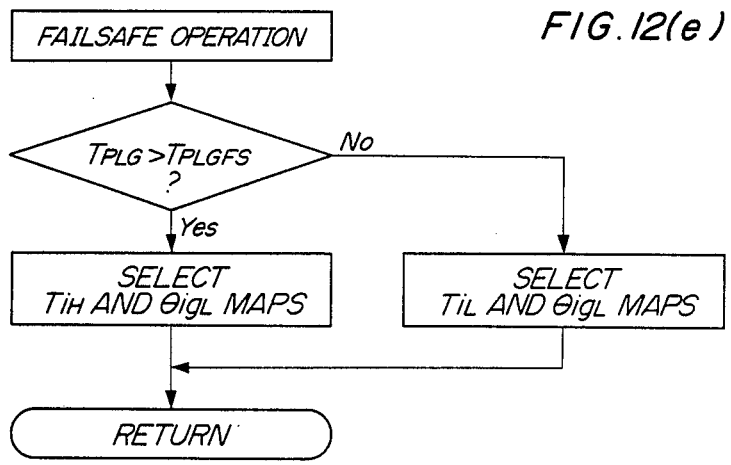
Figure 13A:
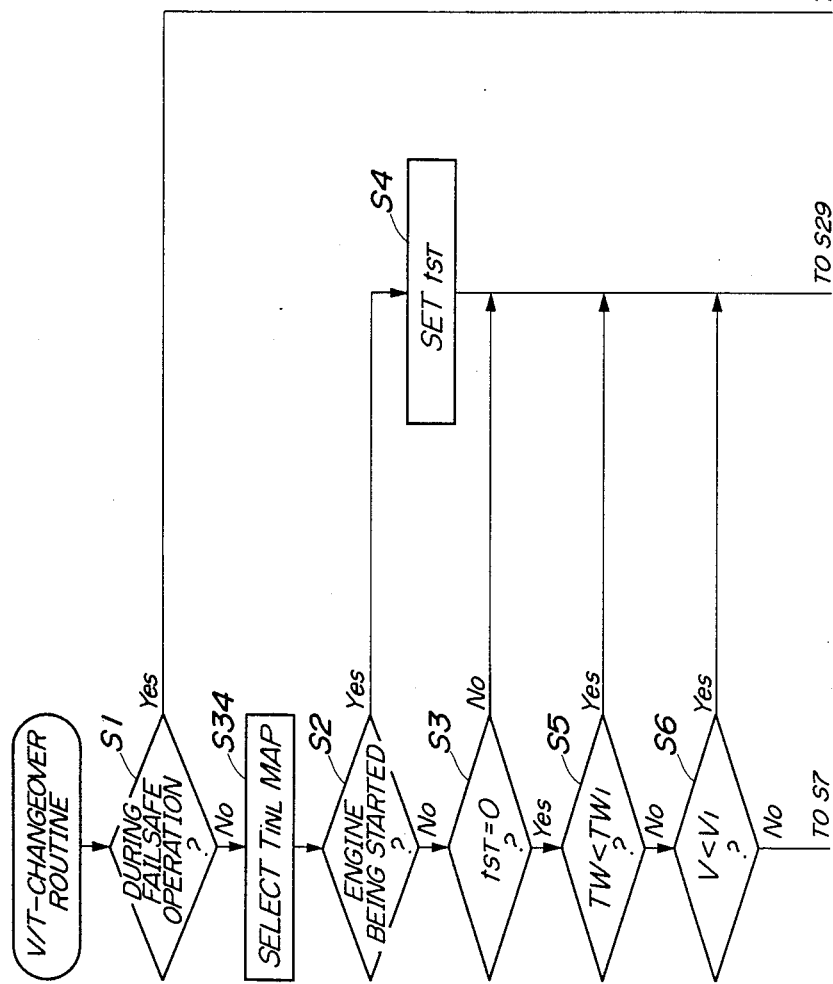
Figure 13B:
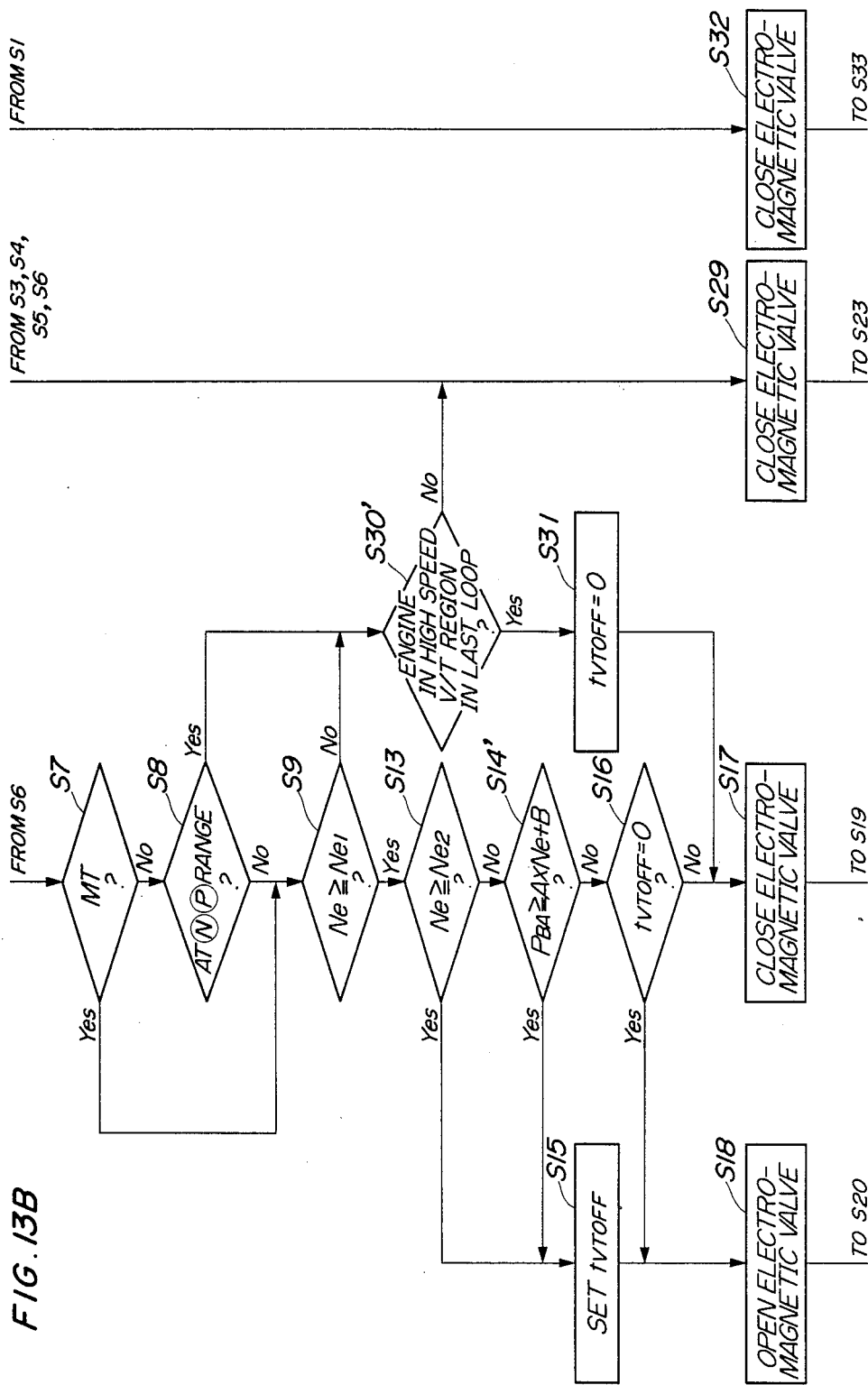

FIG. 11 shows the subroutine used at the step S11 for obtaining the high load determination value $T_{VT}$ from the $T_{VT}$ table. It is determined whether or not the instruction signal for opening the electromagnetic valve 23 has been generated in the immediately preceding loop. If the signal has not been generated, the $T_{VT}$ to be used at the step S12 is set to a value $T_{VT}$ obtained from the $T_{VT}$ table, whereas if the signal has been generated, the $T_{VT}$ to be used at the step S12 is set to a value obtained by subtracting a predetermined hysteresis amount $\Delta T_{VT}$ from a value $T_{VT}$ obtained from the $T_{VT}$ table. Thus, hysteresis is imparted to the changeover characteristic in the region X in FIG. 8.

Referring again to FIG. 9, if the answer to the question of the step S1 is Yes, i.e. if the failsafe operation should be carried out, the instruction signal for closing the electromagnetic valve 23 is generated at a step S32, and then at a step S33 the failsafe operation, described below, is carried out, followed by the program proceeding to the step S27.

(a)–(e) of FIG. 12 show examples of the failsafe operation carried out at the step S33. According to (a) of FIG. 12, when the engine rotational speed Ne is higher than a predetermined value Ne$_{FS}$ (e.g. 3,000 rpm), the $Ti_H$ map for the high speed valve timing and the $\theta ig_L$ map for the low speed valve timing are selected, whereas when the engine rotational speed Ne is not higher than the predetermined value Ne$_{FS}$, the Ti$_L$ map for the low speed valve timing and the $\theta$ig$_L$ map are selected.

As described hereinabove, the values of the basic fuel injection period Ti are set in the Ti$_H$ and Ti$_L$ maps such that the values of the fuel injection period in the Ti$_H$ map for the high speed valve timing are greater than those of the Ti$_L$ map for the low speed valve timing in a region where the engine rotational speed Ne is high (see FIG. 5). Therefore, according to the method shown in (a) of FIG. 12, when the inlet and exhaust valves 40$i$, 40$e$ are actually operated at the high speed valve timing due to failure of any of the selector valve 99, the connection-changeover mechanism 56$i$, 56$e$, etc. in spite of the fact that the instruction signal for closing the electromagnetic valve 23 is generated during the failsafe operation, it is possible to prevent overleaning of the air-fuel ratio and hence an excessive rise in the buring temperature of the mixture or the catalyst temperature of exhaust gas purifying means, and accordingly also prevent melting of ignition plugs due to preignition of the mixture, knocking at a high engine rotational speed, and shortened life of the catalyst.

Further, the above problems are liable to occur in a high load operating condition in which the intake pipe absolute pressure P$_{BA}$ is high. Therefore, according to another example shown in (b) of FIG. 12, the Ti$_H$ map for the high speed valve timing and the $\theta$ig$_L$ map for the low speed valve timing are selected when the intake pipe absolute pressure P$_{BA}$ is higher than a predetermined value P$_{BFS}$ (e.g. 650 mmHg), whereas the Ti$_L$ map for the low speed valve timing and the $\theta$ig$_L$ map are selected when the intake pipe absolute pressure P$_{BA}$ is not higher than the predetermined value P$_{BFS}$.

Further, according to an example shown in (c) of FIG. 12, the Ti$_H$ map and $\theta$ig$_L$ map are selected when the engine rotatioal speed Ne is higher than the aforesaid predetermined value Ne$_{FS}$ (Ne>Ne$_{FS}$), and at the same time the intake pipe absolute pressure P$_{BA}$ is higher than the aforesaid predetermined value P$_{BFS}$ (P$_{BA}$>P$_{BFS}$), whereas the Ti$_L$ map and the $\theta$ig$_L$ map are selected when Ne$\leq$Ne$_{FS}$ or P$_{BA}$$\leq$P$_{BFS}$ is satisfied.

According to an example shown in (d) of FIG. 12, the temperature T$_{CAT}$ of the catalyst in the exhaust gas purifying means is detected. If the temperature T$_{CAT}$ is higher than a predetermined value T$_{CATFS}$ (e.g. 1,000° C.) (T$_{CAT}$>T$_{CATFS}$), the Ti$_H$ map and the $\theta$ig$_L$ map are selected, whereas if T$_{CAT}$$\leq$T$_{CATFS}$ is satisfied, the Ti$_L$ map and the $\theta$ig$_L$ map are selected.

According to an example shown in (e) of FIG. 12, the temperature T$_{PLG}$ of ignition plugs is detected. If the temperature T$_{PLG}$ is higher than a predetermined value T$_{PLGFS}$ (e.g. 950° C.) (T$_{PLG}$>T$_{PLGFS}$), the Ti$_H$ map and the $\theta$ig$_L$ map are selected, whereas if T$_{PLG}$$\leq$T$_{PLGFS}$ is satisfied, the Ti$_L$ map and the $\theta$ig$_L$ map are selected.

The examples shown in (b) to (e) of FIG. 12 can provide substantially the same effects as the example shown in (a) of same.

Next, a second embodiment of the invention will be described. This embodiment is identical to the above-described first embodiment except for the points described below:

In the second embodiment, as maps of the basic fuel injection period Ti, a Ti$_{NL}$ map to be used when the operation of the engine control system is normal, and a Ti$_{FS}$ map to be used for a fail-safe purpose when it is detected that the operation of the engine control system is abnormal are stored in the memory means 5$c$ in place of the Ti$_L$ and Ti$_H$ maps. In the Ti$_{NL}$ map, Ti values are set such that they are suitable for the low speed valve timing in an operating region of the engine in which the low speed valve timing should be employed, and they are suitable for the high speed valve timing in an operating region of the engine in which the high speed valve timing should be employed, whereas in the Ti$_{FS}$ map, Ti values are set such that they make the air-fuel ratio richer than those set in the Ti$_{NL}$ map e.g. they make the air-fuel ratio substantially equal to 14.7 or richer than 14.7, in a predetermined operating region of the engine (e.g. where the low speed valve timing should be employed, and at the same time the engine rotational speed Ne exceeds 3,000 rpm).

As the $\theta$ig map for determining the ignition timing, only a map is stored in the memory means 5$c$, in which $\theta$ig values are set, similarly to the Ti$_{NL}$ map, such that they are suitable for the low speed valve timing in an operating region where the low speed valve timing should be employed, and they are suitable for the high speed valve timing in an operating region where the high speed valve timing should be employed.

FIG. 13 shows a flowchart of a valve timing-changeover control routine of the second embodiment. This flowchart is substantially identical to the flowchart shown in FIG. 9 of the first embodiment except that a step S34 is inserted between the steps S1 and S2, steps S10–S12 and steps S25 and S26 are omitted, "Ti$_L$$\leq$Ti$_H$" at the step S14 is replaced by "P$_{BA}$$\geq$A$\times$Ne+B" (step S14'), and at a step 30', which replaces the step 30, it is determined whether or not the engine was in a high speed valve timing region in the immediately preceding loop. At the step S34, the Ti$_{NL}$ map is selected since the answer to the question of the step S1 is No, i.e. the failsafe operation is not being carried out. Further, at the step S14', it is determined whether or not the intake pipe absolute pressure P$_{BA}$ is equal to or higher than a determination value calculated based on the engine rotational speed Ne by the following equation (2):

$$\text{Determination value} = A \times Ne + B \quad (2)$$

where A and B are constants determined by the predetermined lower limit value Ne$_1$ and the predetermined upper limit value Ne$_2$ described above with reference to FIG. 8, and predetermined pressure values P$_{B1}$ and P$_{B2}$ as follows:

$$A = (P_{B1} - P_{B2})/(Ne_1 - Ne_2)$$

$$B = (Ne_1 \times P_{B2} - Ne_2 \times P_{B1})/(Ne_1 - Ne_2)$$

Consequently, as determined by the steps S9, S13, and S14', the valve timing changeover characteristic is as shown in FIG. 14, where the determination value defined by the equation (2) corresponds to P$_{BA}$ values indicated by the straight line I in the range of Ne$_1$$\leq$Ne>Ne$_2$ in FIG. 14.

FIG. 15 shows flowcharts for examples of the failsafe operation (the step S33) which are applicable in the second embodiment. According to an example in (a) of FIG. 15, when the engine rotational speed Ne is higher than a predetermined value Ne$_{FS}$ (e.g. 3,000 rpm), a Ti$_{FS}$ map is selected for a failsafe purpose, whereas when the engine rotational speed Ne is not higher than the predetermined value NeFS, a $Ti_{NL}$ map for normal operation is selected.

As described hereinbefore, values of the $Ti_{FS}$ map are set such that they make the air-fuel ratio richer than respective corresponding values of the $Ti_{NL}$ map, so that according to the example of (a) of FIG. 15, when the inlet and exhaust valves 40i, 40e are actually operated at the high speed valve timing due to failure of any of the selector valve 99, the connection-changeover mechanisms 56i, 56e, etc. in spite of the fact that the instruction signal for closing the electromagnetic valve 23 is generated during the failsafe operation, it is possible to prevent overleaning of the air-fuel ratio and hence an excessive rise in the buring temperature of the mixture or the catalyst temperature of exhaust gas purifying means, and accordingly also prevent melting of ignition plugs due to preignition of the mixture, knocking at a high engine rotational speed, and shortened life of the catalyst.

Further, the above problems are liable to occur in a high load operating condition in which the intake pipe absolute pressure $P_{BA}$ is high. Therefore, according to another example shown in (b) of FIG. 15, the $Ti_{FS}$ map for failsafe operation is selected when the intake pipe absolute pressure $P_{BA}$ is higher than a predetermined value $P_{BFS}$ (set at e.g. 650 mmHg similarly to the first embodiment), whereas the $Ti_{NL}$ map is selected when the intake pipe absolute pressure $P_{BA}$ is not higher than the predetermined value $P_{BFS}$.

Further, according to an example shown in (c) of FIG. 15, the $Ti_{FS}$ map is selected when the engine rotatioal speed Ne is higher than the aforesaid predetermined value $Ne_{FS}$ ($Ne > Ne_{FS}$), and at the same time the intake pipe absolute pressure $P_{BA}$ is higher than the aforesaid predetermined value $P_{BFS}$ ($P_{BA} > P_{BFS}$), whereas the $Ti_{NL}$ map is selected when $Ne \leq Ne_{FS}$ or $P_{BA} \leq P_{BFS}$ is satisfied.

According to an example shown in (d) of FIG. 15, the temperature $T_{CAT}$ of the catalyst in the exhaust gas purifying means is detected. If the temperature $T_{CAT}$ is higher than a predetermined value $T_{CATFS}$ (set at e.g. 1,000° C. similarly to the first embodiment) ($T_{CAT} > T_{CATFS}$), the $Ti_{FS}$ map is selected, whereas if $T_{CAT} \leq T_{CATFS}$ is satisfied, the $Ti_{NL}$ map is selected.

According to an example shown in (e) of FIG. 15, the temperature $T_{PLG}$ of ignition plugs is detected. If the temperature $T_{PLG}$ is higher than a predetermined value $T_{PLGFS}$ (set at e.g. 950° C. similarly to the first embodiment) ($T_{PLG} > T_{PLGFS}$), the $Ti_{FS}$ map is selected, whereas if $T_{PLG} \leq T_{PLGFS}$ is satisfied, the $Ti_{NL}$ map is selected.

The examples shown in (b) to (e) of FIG. 15 can provide substantially the same effects as the example shown in (a) of same.

Next, a third embodiment of the invention will be described. This embodiment is identical to the above-described second embodiment except for the points described below:

In the third embodiment, the fuel injection period $T_{OUT}$ is calculated by the following equation (1') instead of the above-described equation (1):

$$T_{OUT} = Ti \times K_{FS} \times K_{WOT} \times K_1 + K_2 \quad (1')$$

where as the map for determining the basic fuel injection period Ti, only the $Ti_{NL}$ map described in the second embodiment is stored in the memory means 5c, and $K_{FS}$ is an enriching correction coefficient for a failsafe purpose calculated by methods shown in FIG. 17, referred to hereinafter, and is set e.g. such that it makes the air-fuel ratio substantially equal to 14.7 or richer than 14.7.

In the third embodiment, the valve timing change-over control is carried out in accordance with a program which is identical to the program shown in FIG. 13 of the second embodiment only except that, as shown in FIG. 16, the step S33 in FIG. 13 is replaced by a step S34'. At the step S34', since the answer to the question of the step S1 is No, i.e. the failsafe operation is not being carried out, the correction coefficient $K_{FS}$ is set to a value of 1,0 (non-correction value). Further, at the step S33, the failsafe operation is carried out in accordance with flowcharts shown in FIG. 17. According to an example of (a) of FIG. 17, when the engine rotational speed Ne is higher than a predetermined value $Ne_{FS}$ (set at e.g. 3,000 rpm similarly to the first and second embodiments) for failsafe operation, the enriching correction coefficient $K_{FS}$ is set to a predetermined enriching value $X_{FS}$ ($>1.0$) set, as shown in e.g. (a) of FIG. 18, in accordance with the engine rotational speed Ne, whereas when the engine rotational speed Ne is not higher than the predetermined value NeFS, the enriching correction coefficient $K_{FS}$ is set to a value of 1.0.

According to the example of (a) of FIG. 17, when the inlet and exhaust valves 40i, 40e are actually operated at the high speed valve timing due to failure of any of the selector valve 99, the connection-changeover mechanisms 56i, 56e, etc. in spite of the fact that the instruction signal for closing the electromagnetic valve 23 is generated during the failsafe operation, it is possible to prevent overleaning of the air-fuel ratio and hence an excessive rise in the buring temperature of the mixture or the catalyst temperature of exhaust gas purifying means, and accordingly also prevent melting of ignition plugs due to preignition of the mixture, knocking at a high engine rotational speed, and shortened life of the catalyst.

Further, the above problems are liable to occur in a high load operating condition in which the intake pipe absolute pressure $P_{BA}$ is high. Therefore, according to another example shown in (b) of FIG. 17, the enriching correction coefficient $K_{FS}$ is set to a predetermined enriching value $X_{FS}$ set, as shown in (b) of FIG. 18, in accordance with the intake pipe absolute pressure PBA, when the intake pipe absolute pressure $P_{BA}$ is higher than a predetermined value $P_{BFS}$ (set at e.g. 450 mmHg differently from the first and second embodiments) for failsafe operation, whereas the enriching correction coefficient is set to a value of 1.0 when the intake pipe absolute pressure $P_{BA}$ is not higher than the predetermined value $P_{BFS}$.

Further, according to an example shown in (c) of FIG. 17, the enriching correction coefficient is set to a predetermined enriching value XFS set, as shown in (c) of FIG. 18, in accordance with the engine rotational speed Ne and the intake pipe absolute pressure PBA, when the engine rotatioal speed Ne is higher than the aforesaid predetermined value $Ne_{FS}$ ($Ne > Ne_{FS}$), and at the same time the intake pipe absolute pressure $P_{BA}$ is higher than the aforesaid predetermined value $P_{BFS}$ ($P_{BA} > P_{BFS}$), whereas the the enriching correction coefficient is set to a value of 1.0 when $Ne \leq Ne_{FS}$ or $P_{BA} \leq P_{BFS}$ is satisfied.

According to an example shown in (d) of FIG. 17, the temperature $T_{CAT}$ of the catalyst in the exhaust gas purifying means is detected. If the temperature $T_{CAT}$ is higher than a predetermined value $T_{CATFS}$ (set at e.g. 1,000° C. similarly to the first and second embodiments) ($T_{CAT}>T_{CATFS}$), the enriching correction coefficient $K_{FS}$ is set to a predetermined enriching value $X_{FS1}$ (e.g. 1.3), whereas if $T_{CAT}\leq T_{CATFS}$ is satisfied, the enriching correction coefficient $K_{FS}$ is set to a value of 1.0.

According to a example shown in (e) of FIG. 17, the temperature $T_{PLG}$ of ignition plugs is detected. If the temperature $T_{PLG}$ is higher than a predetermined value $T_{PLGFS}$ (set at e.g. 950° C. similarly to the first and second embodiments) ($T_{PLG}>T_{PLGFS}$), the enriching correction coefficient $K_{FS}$ is set to the predetermined value $X_{FS1}$, whereas if $T_{PLG}\leq T_{PLGFS}$ is satisfied, the enriching correction coefficient is set to a value of 1.0.

The examples shown in (b) to (e) of FIG. 17 can provide substantially the same effects as the example shown in (a) of same.

Further, although in the above-described embodiments, both the valve-opening period and the valve lift amount are changed through changeover of valve timing, this is not limitative, but only one of the valve-opening period and the valve lift amount may be changed. Further, when the engine is in a low engine rotational speed region, one of the inlet valves and one of the exhaust valves of each cylinder may be kept inoperative or closed (the low speed valve timing should be considered to include this inoperative state of valve(s)). This valve operation control can be easily effected by omitting respective corresponding ones of the low speed cams 49$i$, 49$e$ of the valve-operating devices 47$i$, 47$e$.

What is claimed is:

1. A failsafe method in connection with valve timing-changeover control for an internal combustion engine, said engine including a set of inlet valves and a set of exhaust valves and being controlled by a control system having an electronic control unit, at least one of said sets of inlet and exhaust valves having valve timing thereof changeable between low speed valve timing suitable for a lower engine speed region and high speed valve timing suitable for a higher engine speed region, in response to a changeover-instructing signal generated by said electronic control unit;
said failsafe method comprising the steps of:
   (1) detecting an abnormality in said control system of said engine;
   (2) generating said changeover-instructing signal for changing the valve timing to the low speed valve timing in both of said lower and higher engine speed regions, when said abnormality is detected;
   (3) detecting a value of at least one engine operating parameter; and
   (4) when said abnormality is detected, correcting an air-fuel ratio of an air-fuel mixture to be supplied to said engine when said engine is in a predetermined operating condition determined by the detected value of said at least one engine parameter.

2. A failsafe method as claimed in claim 1, wherein the correction of the air-fuel ratio of said step (4) is carried out by enriching the air-fuel ratio.

3. A failsafe method as claimed in claim 2, wherein the enriching of the air-fuel ratio of said step (4) is carried out by multiplying a basic fuel injection period for determining an amount of fuel to be supplied to said engine by a correction coefficient.

4. A failsafe method as claimed in claim 2, wherein said step (4) comprises the steps of:

(4a) providing a first basic fuel injection period map for normal operation and a second basic fuel injection period map for failsafe operation as a map of a basic fuel injection period for determining an amount of fuel to be supplied to said engine, said second basic fuel injection period map having values thereof set relative to respective corresponding values of said first basic fuel injection period map such that the former make the air-fuel ratio richer than the latter do in said predetermined engine operating region; and
   (4b) supplying said engine with an amount of fuel based on a basic fuel injection period read from said second basic fuel injection period map when said engine is in said predetermined operating condition determined by the detected value of said at least one engine parameter, when said abnormality is detected.

5. A failsafe method in connection with valve timing-changeover control for an internal combustion engine, said engine including a set of inlet valves and a set of exhaust valves and being controlled by a control system having an electronic control unit, at least one of said sets of inlet and exhaust valves having valve timing thereof changeable between low speed valve timing suitable for a lower engine speed region and high speed valve timing suitable for a higher engine speed region, in response to a changeover-instructing signal generated by said electronic control unit at a point of time at which a basic fuel injection period value set in a manner suitable for the low speed valve timing and a basic fuel injection period value set in a manner suitable for the high speed valve timing become substantially equal to each other;
said failsafe method comprising the steps of:
   (1) detecting an abnormality in said control system of said engine;
   (2) generating said changeover-instructing signal for changing the valve timing to the low speed valve timing in both of said lower and higher engine speed regions, when said abnormality is detected;
   (3) detecting a value of at least one engine operating parameter; and
   (4) when said abnormality is detected, supplying said engine with an amount of fuel based on said basic fuel injection period value set in a manner suitable for the high speed valve timing when said engine is in a predetermined operating condition determined by the detected value of said at least one engine parameter.

6. A failsafe method as claimed in any one of claims 1 to 5, wherein said at least one engine operating parameter is the rotational speed of said engine, and said predetermined operating condition is a condition in which the rotational speed of said engine is higher than a predetermined value.

7. A failsafe method as claimed in any one of claims 1 to 5, wherein said at least one engine operating parameter is load on said engine, and said predetermined operating condition is a condition in which the load on said engine is greater than a predetermined value.

8. A failsafe method as claimed in any one of claims 1 to 5, wherein said at least one engine operating parameter is the rotational speed of said engine and load on said engine, and said predetermined operating condition is a condition in which the rotational speed of said engine is higher than a predetermined value and at the same time the load on said engine is greater than a predetermined value.

9. A failsafe method as claimed in any one of claims 1 to 5, wherein said at least one engine operating parameter is a catalyst temperature of exhaust gas puriying means provided in an exhaust system of said engine, and said predetermined operating condition is a condition in which said catalyst temperature is higher than a predetermined value.

10. A failsafe method as claimed in any one of claims 1 to 5, wherein said at least one engine operating parameter is a temperature of an ignition plug of said engine, and said predetermined operating condition is a condition in which said temperature of said ignition plug is higher than a predetermined value.

* * * * *